(12) United States Patent
Mukherjee et al.

(10) Patent No.: US 12,177,809 B2
(45) Date of Patent: Dec. 24, 2024

(54) COMMUNICATION OF PAGING NOTIFICATIONS ASSOCIATED WITH MULTIPLE WIRELESS NETWORKS

(71) Applicant: Charter Communications Operating, LLC, St. Louis, MO (US)

(72) Inventors: Amitav Mukherjee, Elk Grove, CA (US); Maulik V. Vaidya, Palmdale, CA (US); Ahmad Reza Hedayat, Aliso Viejo, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 276 days.

(21) Appl. No.: 16/789,297

(22) Filed: Feb. 12, 2020

(65) Prior Publication Data

US 2021/0250900 A1    Aug. 12, 2021

(51) Int. Cl.
*H04W 68/02* (2009.01)
*H04W 68/00* (2009.01)

(52) U.S. Cl.
CPC ......... *H04W 68/02* (2013.01); *H04W 68/005* (2013.01)

(58) Field of Classification Search
CPC ............................ H04W 68/02; H04W 68/005
USPC ...................... 455/426.1, 434, 448, 458, 515
See application file for complete search history.

(56) References Cited

U.S. PATENT DOCUMENTS

| | | | |
|---|---|---|---|
| 5,664,006 A | 9/1997 | Monte et al. | |
| 2004/0029596 A1* | 2/2004 | Kim | H04W 68/02 |
| | | | 455/458 |
| 2005/0233732 A1* | 10/2005 | Kwak | H04H 60/91 |
| | | | 455/414.1 |
| 2011/0105155 A1 | 5/2011 | Bienas et al. | |
| 2013/0029720 A1 | 1/2013 | Clevorn | |
| 2013/0303203 A1* | 11/2013 | Wang | H04W 68/00 |
| | | | 455/458 |
| 2016/0029344 A1 | 1/2016 | Vannithamby et al. | |
| 2016/0157208 A1 | 6/2016 | Liang et al. | |
| 2018/0317198 A1* | 11/2018 | Lee | H04W 76/28 |

FOREIGN PATENT DOCUMENTS

| | | |
|---|---|---|
| WO | 2018144873 A1 | 8/2018 |
| WO | 2019169359 A1 | 9/2019 |
| WO | 2021044932 A1 | 3/2021 |
| WO | 2021054218 A1 | 3/2021 |

OTHER PUBLICATIONS

Random House Webster's College Dictionary, 1173 (2nd Random House ed. 1999).*
International Written Opinion and Search Report, PC/TUS2021/016551, May 14, 2021, pp. 1-11.

* cited by examiner

*Primary Examiner* — Michael Y Mapa
(74) *Attorney, Agent, or Firm* — Armis IP Law, LLC

(57) ABSTRACT

According to one configuration, a wireless network environment includes a first wireless network and a second wireless network. A mobile communication device in the wireless network environment receives first paging notifications directed to the mobile communication device from a first wireless base station such as operated by a first wireless network service provider. The mobile communication device receives second paging notifications directed to the mobile communication device from a second wireless base station such as operated by a second wireless network service provider. The wireless network environment provides improved paging over conventional techniques.

37 Claims, 14 Drawing Sheets

1300

VIA A FIRST WIRELESS NETWORK, TRANSMIT FIRST PAGING NOTIFICATIONS TO A MOBILE COMMUNICATION DEVICE, THE FIRST PAGING NOTIFICATIONS NOTIFYING THE MOBILE COMMUNICATION DEVICE OF PAGING EVENTS ASSOCIATED WITH THE FIRST WIRELESS NETWORK — 1310

↓

MONITOR A SCHEDULE OF SECOND PAGING NOTIFICATIONS, THE SECOND PAGING NOTIFICATIONS SCHEDULED FOR TRANSMISSION TO THE MOBILE COMMUNICATION DEVICE FROM A SECOND WIRELESS NETWORK — 1320

↓

VIA COMMUNICATIONS FROM THE FIRST WIRELESS NETWORK TO THE MOBILE COMMUNICATION DEVICE, NOTIFY THE MOBILE COMMUNICATION DEVICE OF THE SCHEDULE OF PAGING NOTIFICATIONS ASSOCIATED WITH THE SECOND WIRELESS NETWORK — 1330

COMMUNICATION OF PAGING NOTIFICATIONS ASSOCIATED WITH MULTIPLE WIRELESS NETWORKS

BACKGROUND

Conventional wireless networks such as 3GPP specifications only define association of 1 SIM (Subscriber Identity Module) to 1 network (PLMN) for a single mobile communication device (a.k.a., UE or so-called user equipment). However, in many countries across the world, there is a need to have two SIMs associated with the same UE, such as one SIM with a subscription is used for "work" purposes while the second SIM with a subscription is used for "personal or home" purposes.

Another example of multiple SIM (herewith referred to as MUSIM) use-case is to have one SIM with subscription for "voice-only" service, while the second SIM with subscription for "data" services. Given the lack of a globally harmonized standardized solution, various involved entities (chipset manufacturers, device OEMs, network vendors etc.) took it upon themselves to fill the market demand for above mentioned use-cases.

Conventional user equipment includes single Tx/Rx that can only communicate with one network at a time, dual Rx single Tx that can simultaneously receive from two networks, and dual Tx/Rx that can in addition transmit simultaneously to two networks.

The most general case is one in which the multiple networks (PLMNs) are uncoordinated. Due to the lack of coordination, there may be a collision between paging reception on two networks A and B when UE is in IDLE/INACTIVE mode on both. In Rel-17, Network A can be NR; network B can either be LTE or NR.

Furthermore, a single-Rx UE may have to switch its reception to another network before an on-going DL (Down-Link) reception on the current network has been completed.

For example, a UE receiving DL data/control on network A may need to prematurely switch to network B due to an upcoming paging occasion on network B. This leads to conflicts between DL transmission on network A and paging on network B, resulting in a degradation of either data throughput or paging delivery.

BRIEF DESCRIPTION OF EMBODIMENTS

There are deficiencies associated with conventional techniques of supporting switchover from one network to another.

For example, it is desirable that user equipment registered to more than one network (via multiple SIMs) be able to receive pages from more than one network. Depending on user equipment capabilities (e.g., Rx and Tx capabilities) this can create situations in which user equipment is occupied listening to pages from one network, while pages from other networks are simultaneously sent and missed. Further, UEs may be actively communicating with one network while another network pages the UE.

If a user switches between communications towards different networks, situations may occur when a UE/user can no longer receive data from a network it was recently communicating in. Such situations can have a negative impact on performance, e.g., if pages are sent and not properly received, or if users are scheduled while not being able to receive communication.

In contrast to conventional techniques, embodiments herein provide improved use of wireless in a network environment.

Embodiment 1

A wireless network environment includes a first wireless network and a second wireless network. A mobile communication device in the wireless network environment receives first paging notifications directed to the mobile communication device from a first wireless base station such as operated by a first wireless network service provider. The mobile communication device receives second paging notifications directed to the mobile communication device from a second wireless base station such as operated by a second wireless network service provider. The mobile communication device transmits communications to the second wireless base station. In one embodiment, the communications from the mobile communication device notify the second wireless base station of a conflict associated with the mobile communication device receiving the first paging notifications and the second paging notifications.

In accordance with further example embodiments, the communications regarding the paging notification conflict indicate timing attributes of the first wireless base station transmitting the paging notifications to the mobile communication device. In one embodiment, via the timing attribute information, the first wireless base station identifies when the mobile communication device is allocated a time slot (such as a paging occasion) to receive paging notifications from the second wireless network.

Further embodiments herein include generating and/or transmitting the communications to indicate a paging frame periodicity associated with the first paging notifications. In one embodiment, the generated communications indicate an offset between a paging frame from the second wireless base station and a paging frame from the first wireless base station.

Note further that the communications from the mobile communication device can include any suitable information. For example, in one embodiment, the mobile communication device generates the communications to indicate a relative difference between the first paging notifications (assigned paging occasion of the first wireless paging channel associated with the first wireless network) and the second paging notifications (assigned paging occasion of the first wireless paging channel associated with the first wireless network).

Further embodiments herein include generating the communications to indicate an absolute configuration of the first paging notifications and a relative difference between the absolute configuration and the second paging notifications.

In yet another example embodiment, the mobile communication device generates the communications to indicate an absolute or relative difference in time between a time of receiving a first paging notification (or monitoring a first allocated paging occasion) from the first wireless network and a time of receiving a second paging notification (or monitoring a second allocated paging occasion) from the second wireless network.

In yet further example embodiments, the mobile communication device is assigned a first SIM to use the first wireless network. In such an instance, the first paging notifications (and corresponding assigned paging occasions) are associated with a first SIM (Subscriber Identity Module) assigned to the mobile communication device. The mobile communication device is assigned a second SIM to use the second wireless network. The second paging notifications (and corresponding paging occasions) are associated with the second SIM (Subscriber Identity Module) assigned to the mobile communication device. In one embodiment, the mobile communication device supports individual and/or simultaneous use of the first wireless network and the second wireless network.

In still further example embodiments, transmission of the communications from the mobile communication device to the second wireless network notifies the second wireless network and corresponding wireless base station of a paging notification collision/conflict associated with the mobile communication device simultaneously receiving a first paging notification from the first wireless network and a second paging notification from the second wireless network.

Yet further embodiments herein include transmission of the communications from the mobile communication device to the second wireless network to notify the second wireless base station of how to mitigate subsequent paging notification collisions simultaneously communicated from the first wireless base station and the second wireless base station to the mobile communication device.

In accordance with further embodiments, in response to receiving the communication, and to avoid subsequent paging notification (paging occasion) collision between two different wireless paging channels, the second wireless base station adjusts timing of the second paging notifications based on the communications received from the mobile communication device.

Yet further embodiments herein include a mobile communication device that monitors a first wireless paging channel from a first wireless network and a second wireless paging channel from a second wireless network. The mobile communication device receives allocation of first paging occasions associated with the first wireless paging channel. The mobile communication device receives allocation of second paging occasions associated with the second wireless paging channel. Via communications from the mobile communication device to the second wireless network, the mobile communication device notifies the second wireless network of timing information and/or a timing conflict associated with the mobile communication device monitoring the first paging occasions and the second paging occasions.

In accordance with further example embodiments, the communications from the mobile communication device indicate timing attributes of the first paging occasions with respect to the second paging occasions.

In yet further example embodiments, the mobile communication device generates the communications to indicate a paging frame periodicity associated with the first paging occasions allocated to the mobile communication device.

Further embodiments herein include, via the mobile communication device (or other suitable resource), generating the communications to indicate an offset between a paging frame from the second wireless network and a paging frame from the first wireless network. Additionally, or alternatively, the mobile communication device generates the communications to indicate timing offset between the first paging occasions and the second paging occasions.

In still further example embodiments, transmission of the communications from the mobile communication device to the second wireless network notifies the second wireless network of an inability of the mobile communication device to simultaneously monitor the first paging occasions on the first wireless paging channel and monitor the second paging occasions on the second wireless paging channel. The second wireless network then re-allocates a different set of paging occasions for use by the mobile communication device from the second wireless paging channel such that the mobile communication device is able to switch between monitoring paging occasions on both the first wireless paging channel and the second wireless paging channel.

Embodiment 2

A wireless network environment includes a first wireless network and a second wireless network. The first wireless network transmits first paging notifications to a mobile communication device, the first paging notifications notifying the mobile communication device of paging events associated with the first wireless network. The first wireless network also monitors a schedule of second paging notifications scheduled for transmission to the mobile communication device from a second wireless network. Via communications from the first wireless network to the mobile communication device, first wireless network notifies the mobile communication device of the schedule of paging notifications associated with the second wireless network. Thus, the first wireless network provides paging notifications for both the first wireless network and the second wireless network.

In accordance with further example embodiments, notification to the mobile communication device of the schedule of paging notifications includes: notifying the mobile communication device of an absence of a paging notification in a corresponding paging frame of a wireless paging channel from the second wireless network in the schedule.

In still further example embodiments, notification to the mobile communication device of the schedule of paging notifications includes: notifying the mobile communication device of an absence of a paging notification from the second wireless network in a particular paging cycle of multiple paging cycles.

In accordance with further embodiments, notification to the mobile communication device of the schedule of paging notifications includes: notifying the mobile communication device of an upcoming paging notification scheduled for transmission from the second wireless network to the mobile communication device.

The communications from the first wireless network can include any suitable information. For example, in one embodiment, the communications from the first wireless network to the mobile communication device informs the mobile communication device not to monitor for second paging notifications from the second wireless base station.

In yet further embodiments, the communications from the first network is or includes a message notifying the mobile communication device to skip monitoring for presence of a paging notification from the second wireless network. In one embodiment, the message is a paging notification from the first wireless network.

In still further example embodiments, the first paging notifications are associated with a first SIM (Subscriber Identity Module) assigned to the mobile communication device; the first SIM (such as provided to the mobile communication device by a first wireless network service provider) provides the mobile communication device use of the first wireless network. The second paging notifications are associated with a second SIM (Subscriber Identity Module) assigned to the mobile communication device; the second SIM (such as provided to the mobile communication device by a second wireless network service provider) provides the mobile communication device use of the second wireless network.

In still further example embodiments, the communications from the first wireless network include a first paging notification generated by the first wireless network. In one embodiment, the first paging notification is included in a data field of a downlink control channel message from the first wireless network to the mobile communication device.

In yet further example embodiments, a data field of the communications from the first wireless network indicates how many occurrences that the second paging notifications are not scheduled for transmission from the second wireless network.

Embodiment 3

A wireless network environment includes a first wireless network and a second wireless network. A mobile communication device in the wireless network environment receives paging notifications from the first wireless network. In response to receiving input while the mobile communication device is wirelessly connected to the first wireless network, the mobile communication device generates a switchover notification indicating a planned temporary switchover tuning (such as a so-called tune-away) of the mobile communication device to the second wireless network. The mobile communication device transmits the switchover notification to the first wireless network. The switchover notification informs the first wireless network of the planned temporary switchover tuning.

In accordance with further example embodiments, the mobile communication device receives a paging notification from the first wireless network. The mobile communication device produces an acknowledgement message acknowledging receipt of the paging notification by the mobile communication device from the first network. The mobile communication device communicates the acknowledgement message to the first wireless network. In one embodiment, the acknowledgement message includes the switchover notification indicating the temporary planned switchover tuning.

The planned switchover notification can include any suitable information. For example, in one embodiment, the planned switchover notification indicates a duration of time in which the mobile communication device is scheduled to be unavailable to monitor for receipt of paging notifications from the first wireless network.

In yet further example embodiments, while monitoring a paging notification channel of the second wireless network during the planned temporary switchover tuning, the mobile communication device detects a paging notification directed to the mobile communication device. In one embodiment, the paging notification indicates a grant of wireless resources associated with the second wireless network to the mobile communication device. In response to detecting the paging notification from the second wireless network, the mobile communication device communicates an updated planned switchover notification over the first wireless communication link to the first wireless network. The updated planned switchover notification informs the first wireless network that an initial planned duration of the temporary switchover tuning of the mobile communication device to the second wireless network has been extended.

In yet further example embodiments, the switchover tuning by the mobile communication device includes a temporary tune-away of wireless hardware of the mobile communication device from the first wireless network to the second wireless network. That is, the mobile communication device tunes hardware of the mobile communication device from the first wireless network to the second wireless network back to the first wireless network. Subsequent to the temporary tune-away to the second wireless network, the mobile communication device utilizes its wireless hardware to monitor a paging notification channel of the first wireless network again.

In accordance with further example embodiments, a first SIM (Subscriber Identity Module) is assigned to the mobile communication device and supports connectivity of the mobile communication device to the first network operated by a first wireless network service provider. A second SIM (Subscriber Identity Module) is assigned to the mobile communication device supports connectivity of the mobile communication device to the second network operated by a second wireless network service provider.

In one embodiment, the first wireless network terminates communication of paging notifications to the mobile communication device during the planned temporary switchover tuning of the mobile communication device to the second wireless network.

In accordance with further example embodiments, the planned temporary switchover notification indicates a duration of time that the mobile communication device tunes its corresponding antenna hardware to the second wireless network instead of the first wireless network for a duration of time. After expiration of the duration of time, the mobile communication device tunes its antenna hardware back to the first wireless network.

Embodiment 4

A wireless network environment includes a mobile communication device and a first wireless network. The first wireless network receives input indicating to operate a wireless paging channel in a paging repetition mode for a mobile communication device. In response to receiving the input, the first wireless network allocates multiple paging occasions in a respective paging frame cycle of the wireless paging channel to the mobile communication device. Via the wireless paging channel, in accordance with the paging repetition mode, the first wireless network (such as a corresponding wireless base station) repeats a given paging notification in each of the multiple paging occasions allocated to the mobile communication device.

In one embodiment, the repetition of given paging notification in multiple different paging occasions of the wireless paging channel ensures that the mobile communication device is able to receive the given paging notification even if the mobile communication device happens to miss receiving the given notification in one of the allocated paging occasions. For example, in one embodiment, the repetition of the given paging notification allows the mobile communication device to temporarily tune-away to a second wireless network and return to monitoring the wireless paging channel of the first wireless network in sufficient time to detect at least one rendition of the given paging notification.

Further embodiments herein include, from the first wireless network, transmitting the given paging notification from the wireless paging channel to the mobile communication device in response to detecting that the mobile communication device is a multi-SIM device that subscribes to the first wireless network and a second wireless network. In one embodiment, the given paging notification is associated with a first SIM (Subscriber Identity Module) assigned to the mobile communication device; the first SIM is provided to the mobile communication device by a first wireless network so. The mobile communication device is assigned a second SIM (Subscriber Identity Module) to support wireless communications with the second wireless network. If desired, the second wireless network can be configured to support repetition of paging notifications (paging repetition mode) to the mobile communication device on its corresponding (second) wireless paging channel. Supporting the paging repetition mode on multiple different wireless paging channels of different wireless networks provides yet further flexibility to the mobile communication device because the mobile communication device is able more easily receive paging notifications on the different wireless channels.

In accordance with further example embodiments, the multiple paging occasions on the wireless paging channel of the first wireless network includes a first paging occasion and a second paging occasion. The first paging occasion is present in a first paging frame of the wireless paging channel; the second paging occasion is present in a second paging frame of the wireless channel. Repetition of the given paging notification includes: i) encoding the first paging occasion to include the given paging notification, and ii) encoding the second paging occasion to include the given paging notification.

In yet further embodiments, the multiple paging occasions includes a first paging occasion and a second paging occasion in a single paging frame of the wireless paging channel. In such an embodiment, repeating the given paging notification includes: i) encoding the first paging occasion to include the given paging notification, and ii) encoding the second paging occasion to include the given paging notification. In one embodiment, the first paging occasion is contiguous with the second paging occasion in the wireless paging channel.

Yet further embodiments herein include providing notification that the wireless paging channel of the first wireless network supports representation of paging notifications. For example, embodiments herein include communicating a wireless message from the wireless base station of the first wireless network to the mobile communication device. The wireless message notifies the mobile communication device that the first wireless network supports paging repetition. As previously discussed, the mobile communication device can be configured to notify the first wireless network to provide repetition of paging notifications.

In yet further example embodiments, the multiple paging occasions includes a first paging occasion and a second paging occasion of the wireless paging channel. Repetition of the given paging notification includes encoding the second paging occasion to include the given paging notification in response to detecting that the mobile communication device missed receiving the given paging notification in the first paging occasion.

In one embodiment, a respective paging notification carries or includes an index value indicating the order of repetition of the paging notification. For instance a first paging occasion can be configured to carry a first paging message and a first index value; a second paging occasion can be configured to include a second paging message and a second index value; a third paging notification can be configured to include a third paging message and a third index value; and so on. In one embodiment, the user equipment (UE) uses the index values to further tune its operation for subsequent reading of the future paging notifications.

As a more specific example, in one embodiment, the multiple paging occasions includes a first paging occasion and a second paging occasion, the first paging occasion being included in a first paging frame of the wireless paging channel and the second paging occasion being included in a second paging frame of the wireless channel. Repeating the given paging notification includes: i) encoding the first paging occasion to include the given paging notification and a first identifier value indicating that the given paging notification in the first paging occasion is a first transmission of the paging notification, and ii) encoding the second paging occasion to include the given paging notification and a second identifier value indicating that the given paging notification in the second paging occasion is a second transmission of the paging notification.

In accordance with further example embodiments, the multiple paging occasions includes a first paging occasion and a second paging occasion in a respective same paging frame of the wireless paging channel. In one embodiment, repeating the given paging notification includes: i) encoding the first paging occasion to include the given paging notification and a first identifier value indicating that the given paging notification in the first paging occasion is a first transmission of the paging notification, and ii) encoding the second paging occasion to include the given paging notification and a second identifier value indicating that the given paging notification in the second paging occasion is a second transmission of the paging notification.

Yet further embodiments herein include, at the wireless base station, receiving the input in a communication from the mobile communication device. As previously discussed, the input indicates that the mobile communication device supports connectivity with multiple wireless networks including the first wireless network and the second wireless network. In one embodiment, the input is a request from the mobile communication device notifying the first wireless network to support a specific type of paging notifications over the wireless paging channel of the first wireless network.

As previously discussed, embodiments herein are useful over conventional paging notifications. For example, repetition of a respective paging notifications as described herein ensures a high likelihood that the mobile communication device will receive a respective paging notification. When repetition of paging notifications is implemented in a wireless paging channel from the first wireless network and a wireless paging channel from the second wireless network, the mobile communication device is able to more easily receive paging notifications from the two different networks.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: receive first paging notifications directed to a mobile communication device from a first wireless station; receive second paging notifications directed to the mobile communication device from a second wireless station; and transmit communications to the second wireless base station, the communications notifying the second wireless base station of a conflict associated with the mobile communication device receiving the first paging notifications and the second paging notifications.

Another embodiment includes a computer readable storage medium and/or system having instructions stored thereon. The instructions, when executed by the computer processor hardware, cause the computer processor hardware (such as one or more co-located or disparately processor devices or hardware) to: at a mobile communication device: receive allocation of first paging occasions associated with a first wireless paging channel, the first wireless paging channel associated with a first wireless network; receive allocation of second paging occasions of a second wireless paging channel, the second wireless paging channel associated with a second wireless network; and via communications from the mobile communication device to the second wireless network, notify the second wireless network of timing information associated with the mobile communication device monitoring the first paging occasions and the second paging occasions.

Another embodiment includes a computer readable storage medium and/or system having instructions stored thereon. The instructions, when executed by the computer processor hardware, cause the computer processor hardware (such as one or more co-located or disparately processor devices or hardware) to: transmit first paging notifications to the mobile communication device, the first paging notifications notifying the mobile communication device of paging events associated with the first wireless network; monitor a schedule for second paging notifications scheduled for transmission to the mobile communication device from a second wireless network; and via communications from the first wireless network to the mobile communication device, notify the mobile communication device of the schedule of paging notifications associated with the second wireless network.

Another embodiment includes a computer readable storage medium and/or system having instructions stored thereon. The instructions, when executed by the computer processor hardware, cause the computer processor hardware (such as one or more co-located or disparately processor devices or hardware) to: receive input at a wireless base station in a first wireless network, the input indicating that a mobile communication device supports connectivity with both the first wireless network and a second wireless network; in response to receiving the input, allocate multiple paging occasions on a wireless paging channel from the first wireless network to the mobile communication device; and on the wireless paging channel, repeat a given paging notification in each of the multiple paging occasions allocated to the mobile communication device.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing dynamic data flow prioritization that varies depending on current network conditions. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
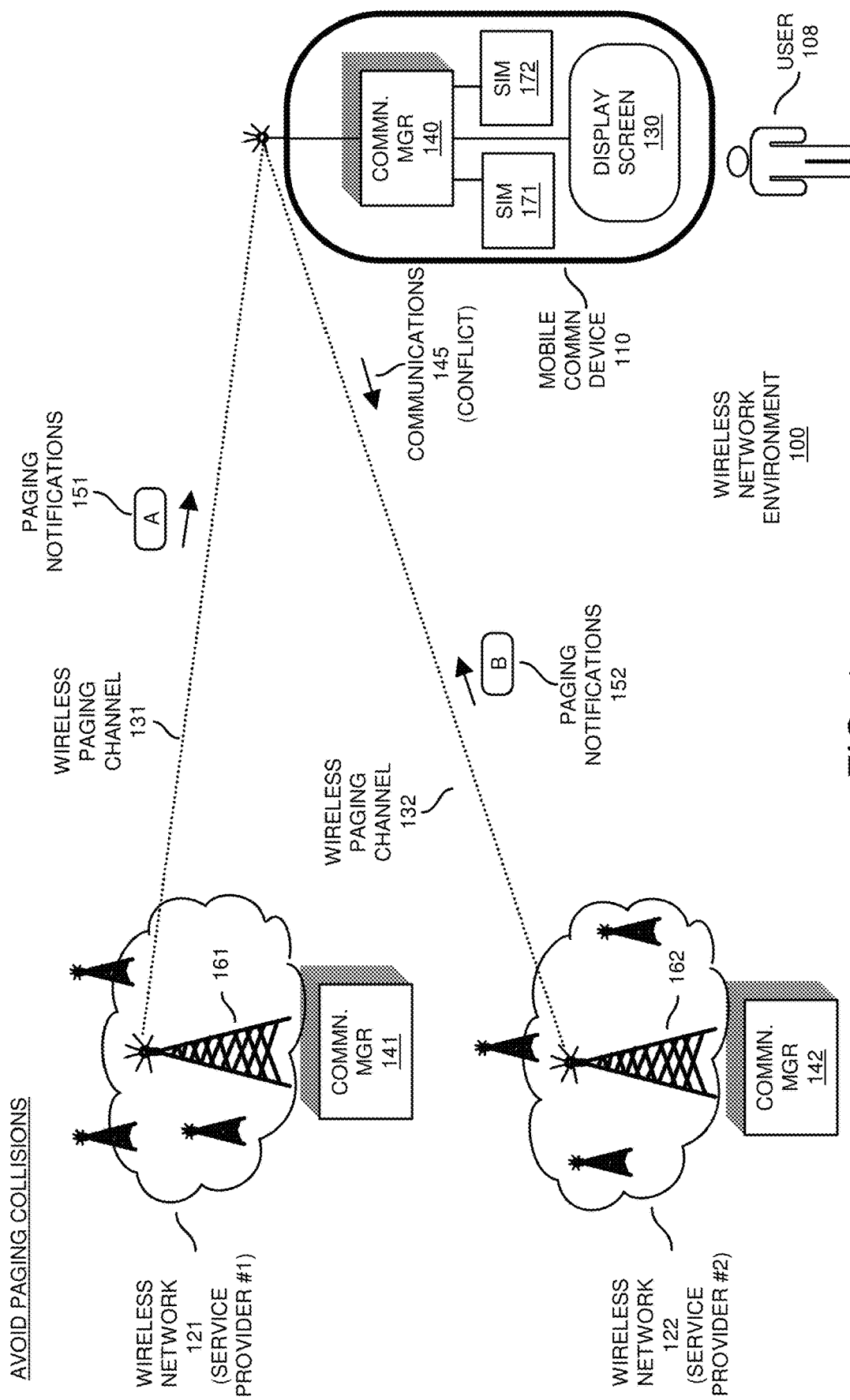
FIG. 1 is an example diagram of a wireless network environment providing wireless paging notifications (and paging occasions) via different wireless networks according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

According to one configuration, a wireless network environment includes a first wireless network and a second wireless network. A mobile communication device in the wireless network environment receives first paging notifications (in first paging occasions) directed to the mobile communication device from a first wireless base station such as operated by a first wireless network service provider. The mobile communication device receives second paging notifications (in paging occasions) directed to the mobile communication device from a second wireless base station such as operated by a second wireless network service provider. In one embodiment, the first wireless network service provider operates the first wireless network independently of the second service provider operating the second wireless network. Different embodiments herein provide improved ways of implementing paging notifications and distribution of information in a wireless network environment supporting multiple wireless networks.

More specifically, with reference to the drawings, FIG. 1 is an example diagram of multiple wireless networks independently operated with respect to each other to provide wireless paging notifications according to embodiments herein.

As shown in FIG. 1, wireless network environment 100 includes a first wireless network 121, a second wireless network 122, and mobile communication device 110.

Via wireless paging channel 131, the wireless network 121 communicates paging notifications 151 to one or more mobile communication devices in the wireless network environment 100.

Via wireless paging channel 132, the wireless network 122 communicates paging notifications 152 to one or more mobile communication devices in the wireless network environment 100.

In one embodiment, user 108 subscribes to use of both wireless network 121 and wireless network 122. For example, assume that the mobile communication device 110 is assigned a first SIM 171 (Subscriber Identity Module) provided by a first wireless network service provider to use the first wireless network 121 and corresponding wireless connectivity provided by wireless network 121. In such an instance, the first paging notifications 151 communicated over wireless paging channel 131 (and one or more respective allocated paging occasions) are associated with a first SIM 171 assigned to the mobile communication device 110.

The mobile communication device 110 is assigned a second SIM (Subscriber Identity Module) 172 via a second wireless network service provider to use the second wireless network 122. The second paging notifications 152 communicated over the wireless paging channel 132 (and one or more respective allocated paging occasions) are associated with the second SIM 172 assigned to the mobile communication device 110.

In certain instances, note that the first SIM 171 and the second SIM 172 are provided by a same wireless network service provider. However, in such an instance, the first wireless network 121 supports a first type of wireless communications such as voice or telephony communications. The second wireless network 122 supports a second type of wireless communications such as data communications (such as supporting web page retrieval, email retrieval, video content delivery, etc.).

In general, a SIM is an integrated circuit that securely stores information such as the international mobile subscriber identity (IMSI). In certain instances, it is a memory chip that enables a respective user to receive and establish phone calls via the mobile communication device 110. The identity information provides a way to send communications to the mobile communication device 110.

In this example embodiment, assume that the wireless network 121 is operated by a first service provider (wireless network service provider #1) and includes any number of wireless base stations including wireless base station 161. Wireless base station 161 includes communication manager 141 (such as a gNode B or other suitable entity) that receives paging notifications directed to the mobile communication device 110 (and potentially other mobile communication devices) and communicates such paging notifications 151 in respective paging occasions over the wireless paging channel 131 in the wireless network environment 100.

Wireless network 122 operated by a second service provider includes any number of wireless base stations including wireless base station 162. Wireless base station 162 includes communication manager 142 (such as a gNode B or other suitable entity) and receives paging notifications directed to the mobile communication device 110 (and potentially other mobile communication devices) and communicates such paging notifications 152 in respective paging occasions over the wireless paging channel 132 in the wireless network environment 100.

Note that the mobile communication device 110 supports individual and/or simultaneous use of the first wireless network 121 and the second wireless network 122. Communication of the one or more paging notifications 151 over wireless paging channel 131 informs the mobile communication device 110 of any suitable event (alert, message, etc.) such as that the wireless network 121 has something available for the mobile communication device 110, the mobile communication device 110 should perform a respective function, etc.

Thus, via the wireless paging channel 131, the mobile communication device 110 in the wireless network environment 100 receives first paging notifications 151 directed to the mobile communication device 110 from a first wireless base station 161 (and communication manager 141) such as operated by a first wireless network service provider (service provider 1).

The mobile communication device also receives second paging notifications 152 directed to the mobile communication device 110 from the second wireless base station 162 (and communication manager 142) such as operated by a second wireless network service provider (service provider #2).

In one embodiment, the mobile communication device 110 monitors receipt of paging notifications and/or assigned paging occasions and provides feedback (such as via communications 145) to one or both of the wireless network 121 and wireless network 122 regarding receipt of paging notifications (and/or allocated paging occasions) over the wireless paging channel 131 and wireless paging channel 132.

For example, in one embodiment the communication management resource 140 of the mobile communication device 110 monitors for and detects a conflict associated with receiving the paging notifications 151 (and/or allocated paging occasions) from the wireless network 121 and the paging notifications 152 (and/or allocated paging occasions) from the second wireless network 122. This can include detecting that the paging notifications (or allocated paging occasions) are scheduled for transmission or are received too close in time (or overlapping) with respect to each other on different wireless paging channels. This condition (overlapping or too close in time paging occasions and/or paging notifications on different wireless paging channels) is undesirable because the mobile device 110 may not be able to switch quickly enough between the wireless paging channels 131 and 132 to receive paging notifications if they are communicated to close in time to each other.

In response to detecting the paging notification conflict (such as collisions or nearness in time), the communication management resource 140 of the mobile communication device 110 transmits communications 145 to the second wireless base station 162. In one embodiment, the communications 145 from the mobile communication device 110 notify the second wireless base station 162 of the detected conflict associated with the mobile communication device 110 receiving the first paging notifications 151 (or corresponding allocated paging occasions) and the second paging notifications 152 (or corresponding allocated paging occasions).

In accordance with further example embodiments, note that the communications 145 from the mobile communication device 110 to wireless network 121 can indicate timing attributes of the first wireless base station 161 transmitting and/or mobile communication device 110 receiving the paging notifications 151. The timing attributes can include information indicating timing attributes of wireless base station 161 communicating paging notifications 151 to the mobile communication device 110.

Further embodiments herein include generating and/or transmitting the communications 145 to indicate a paging frame periodicity associated with the first paging notifications 151. In one embodiment, communication of the paging frame periodicity or other suitable information enables the wireless network 122 to identify an offset of paging frames from the wireless paging channel 132 with respect to the wireless paging channel 131.

In addition to or as an alternative to paging frame periodicity, the mobile communication device 110 can be configured to notify the wireless network 122 of the specific time slot (such as allocated paging occasion) of the paging frame (and/or paging occasions of the paging frame) in which the mobile device 110 is assigned to receive the paging notifications from the wireless network 121.

Thus, if desired, the generated communications 145 from the mobile communication device 110 indicate an offset between a paging frame from the second wireless base station 162 (wireless paging channel 132) and a paging frame from the first wireless base station 161 (wireless paging channel 131).

Alternatively, the communications 145 indicate an absolute time of paging occasions of the wireless paging channel 131 allocated for use by the mobile communication device 110. Based on such information, the wireless network 122 adjusts the paging occasions of the wireless paging channel 132 allocated to the mobile communication device 110 such that they are sufficiently spaced apart from the allocated paging occasions of the wireless paging channel 131.

Note that yet further specific embodiments herein include provisioning by the mobile communication device 110 (user equipment) of its paging configuration on network 121 (a.k.a., network A) to network 122 (a.k.a., network B), or vice versa.

For example, either of wireless networks 121 or 122 may broadcast a request for provision of said information (such as timing information associated with paging notifications and/or paging occasions as described herein from each of the different wireless paging channels) by INACTIVE UEs, or send a dedicated higher-layer request to CONNECTED mode UEs. In other words, a respective network (such as wireless network 121 or wireless network 122) can be configured to request that mobile communication device 110 in the wireless network environment 100 provide information about timing of the mobile communication device 110 receiving paging notifications (and/or allocated paging occasions) on different wireless paging channels. Additionally, or alternatively, the mobile communication device 110 and corresponding communication manager 140 can be configured to know to provide communications 145 including timing information and or conflict as described herein.

In one embodiment, the timing information (feedback) in communications 145 received from the mobile communication device 110 is used by the recipient network (wireless network 121 and/or wireless network 122) to mitigate subsequent paging collisions with each other or with other networks on which the mobile communication device 110 may be monitoring paging, as described in subsequent embodiments.

Note that the UE (mobile communication device 110) may be in an INACTIVE or a CONNECTED mode on a respective network to which it is sending the paging configuration message (such as in communications 145), since small data transmissions in INACTIVE mode are supported in Rel-17.

Note further that the mobile communication device 110 can be configured to provide timing information associated with either a relative paging configuration notification (communications 145) or an absolute paging configuration notification (communications 145) regarding the paging notification conflict (such as collisions, near collisions, general information about timing associated with paging notifications on different wireless paging channels, etc.) experienced by the mobile communication device 110 receiving paging notifications from wireless paging channel 131 and wireless paging channel 132.

For example, as further discussed herein, if the mobile communication device 110 sends the Network A (wireless network 121) configuration information (paging notification information) as detected by the mobile communication device 110 to Network B (wireless network 122), Network B is informed of the paging frame/paging occasion information on network A (121) associated with the mobile communication device 110. In certain instances, the information in the communications 145 prompts the wireless network 122 to adjust timing associated with the wireless paging channel 132 to avoid conflict of paging occasions allocated on each of the wireless paging channels 131 and 132.

Relative Paging Notification Information

In one embodiment, the mobile communication device 110 (UE) provides the any or all of the following information to network B (122) in case of relative paging configuration signaling:
- Frame offset between UE paging frames (such as PF with lowest System Frame Number) on network A (121) and PFs (PF with lowest SFN) on network B (122).
- PF periodicity (such as width of paging cycle) on network A (wireless network 121) relative to PF periodicity (such as width of paging cycle) on network B (wireless network 122).
- Slot offset between start of UE POs (Paging Occasions) on network A (wireless network 121) and start of POs (paging occasions) on network B (wireless network 122). In one embodiment, the slot offset duration is with reference to the subcarrier spacing on network B.

Absolute Paging Notification Information

Additionally, or alternatively, the mobile communication device 110 (UE) provides any or all of the following information in communications 145 to network B (122) in case of absolute paging configuration signaling:
- Lowest PF (paging frame) SFN (System Frame Number) on network A (121)
- PO (paging occasion or paging notification) locations (such as time slot) within PF (paging frame) on network A (121)
- paging frame periodicity (paging cycle or paging frame spacing) on network A (121)
- SFN (System Frame Number) offset between paging notification frames in network 121 and paging notification frames in network 122.

One non-limiting example of the proposed RRC (Radio Resource Control) message, PagingConfigReport, from a RRC_INACTIVE UE (mobile communication device 110) to the network is given next for the relative paging configuration. In this example embodiment, the signaling radio bearer is assumed to be SRB0, logical channel is CCCH, and RLC-SAP is assumed to be TM. A CONNECTED UE may use SRB1 or SRB2.

```
-- ASN1START
-- TAG-PagingConfigReport-START
PagingConfigReport ::=          SEQUENCE {
    PagingFrameOffset            BIT STRING (SIZE
(10) )
    POStart_SlotOffset           BIT STRING (SIZE
(6) )
    RelativePagingCycle          ENUMERATED
{ FourT, TwoT, OneT, HalfT, QuarterT}
}
-- TAG-PagingConfigReport-STOP
-- ASN1STOP
```

Another non-limiting example of the proposed RRC message, PagingConfigReport, from an RRC_INACTIVE UE (mobile communication device 110) to the network is given next for the absolute paging configuration. The PO (Paging Occasion) locations are indicated in granularity of slot locations (such as via an index or other suitable value) within the PF (Paging Frame). The cross-network paging cycle is in units of radio frames. Signaling radio bearer is assumed to be SRB0, logical channel is CCCH, and RLC-SAP is assumed to be TM. A CONNECTED UE may use SRB1 or SRB2.

```
-- ASN1START
-- TAG-PagingConfigReport-START
PagingConfigReport ::=          SEQUENCE {
    PagingFrameSFN               BIT STRING (SIZE
(10) )
    POlocations                  BIT STRING (SIZE
(6) )
    SFNOffset                    BIT STRING (SIZE
(10) )
    CrossPagingCycle             ENUMERATED {rf32,
rf64, rf128, rf256, spare}
}
-- TAG-PagingConfigReport-STOP
-- ASN1STOP
```

Figure 2:
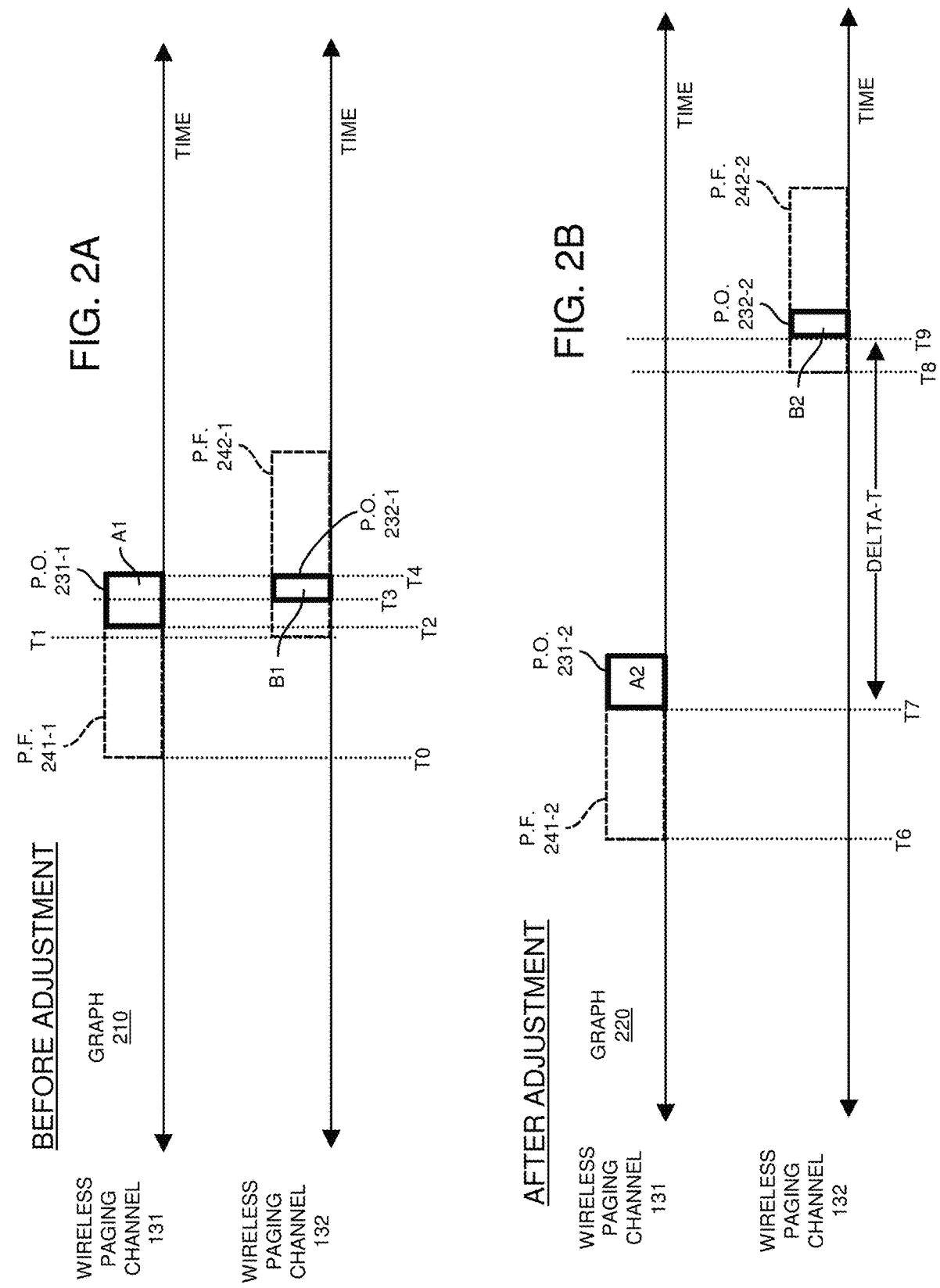
FIG. 2A is an example diagram illustrating collisions (or near collisions) of paging occasions and/or paging notifications occurring in two different wireless paging channels according to embodiments herein.
FIG. 2B is an example diagram illustrating implementation of wireless paging channel adjustments according to embodiments herein.

FIG. 2A is an example diagram illustrating collisions occurring in two different wireless paging channels according to embodiments herein.

Graph 210 in FIG. 2A illustrates collision (or near collisions) of paging notifications transmitted to the mobile communication device 110 over different wireless paging channels 131 and 132.

For example, wireless paging channel 131 includes paging frame 241-1; wireless paging channel 132 includes paging frame 242-1.

Paging notification 231-1 (or paging occasion) in paging frame 241-1 of wireless paging channel 131 is directed to the mobile communication device 110 from wireless network 121; paging notification 232-1 (or paging occasion) in paging frame 242-1 of wireless paging channel 132 is directed to the mobile communication device 110 from wireless network 122.

Because the paging notification 231-1 (paging occasion) and paging notification 232-1 (paging occasion) are transmitted in the same duration of time between time T2 and time T4 (resulting in a so-called collision or near collision), the mobile communication device 110 is unable to receive both paging notifications in the event that it does not include such antenna hardware to simultaneously monitor both. If the mobile communication device 110 is unable to simultaneously tune to and receive the paging notification 231-1 (in a respective allocated paging occasion of wireless paging channel 131) and paging notification 232-1 (in a respective allocated paging occasion of wireless paging channel 132)

from both wireless base stations 161 and 162, the mobile communication device 110 will miss a respective paging notification on one wireless paging channel or the other.

Even if the paging notifications 231-1 and 232-1 are sent at non-overlapping times, note that the mobile communication device 110 may not be able to switch its receiver antenna hardware quickly enough between monitoring the wireless paging channel 131 and the wireless paging channel 132 to simultaneously receive the paging notifications 231-1 and 232-1.

As previously discussed, embodiments herein address such issues (overlapping paging notifications or paging notifications transmitted around the same time) via providing timing information to either or both networks to modify times (such as paging frames and/or time slots or paging occasions in the paging frames) when the different wireless networks 121 and 122 communicate the paging notifications to the mobile communication device 110. In one embodiment, the adjustments to the paging occasions in at least one of the wireless paging channels 131 and 132 ensures that the mobile communication device 110 is able to receive paging notifications from both wireless networks.

In one embodiment, the mobile communication device 110 is aware of the different time slots (such as indexed based pointer indicating which time slot or paging occasion of a respective paging frame potentially includes a paging notification for the mobile communication device 110) and different paging frames in which the paging notifications 231-1 and paging notification 232-1 are transmitted. In one embodiment, with such information, the mobile communication device 110 generates communications 145 indicating the conflict (or near conflict) as well as timing information associated with paging notifications communicated on different wireless paging channels.

The communications 145 from the mobile communication device 110 can include any suitable information. For example, in one embodiment, the mobile communication device 110 generates the communications 145 to indicate a relative difference between a first paging notification 231-1 (first paging occasion) and a second paging notification 232-1 (second paging occasion) in graph 210 of FIG. 2A.

Alternatively, in one example embodiment, the mobile communication device 110 generates the communications 145 to indicate an absolute difference in time between a time T2 (such as start time) of receiving the first paging notification 231-1 (or assigned paging occasion) on wireless paging channel 131 and a time T3 (such as start time) of receiving the second paging notification 232-1 (or assigned paging occasion) on the wireless paging channel 132. In either case, the wireless network 121 and corresponding communication manager 142 is notified of timing information indicating the nearness in time of the paging occasions on each wireless paging channel.

Thus, transmission of the communications 145 from the mobile communication device 110 to the wireless base station 162 associated with the second wireless network 122 notifies the second wireless network 122 and corresponding wireless base station 162 of a collision associated with the mobile communication device 110 simultaneously receiving the first paging notification 231-1 (paging occasion) from the first wireless network 121 and the second paging notification 232-1 (paging occasion) from the second wireless network 122.

As previously discussed, note that the timing information generated by the mobile communication device 110 need not be based on actual experience of the mobile communication device 110 simultaneously receiving paging notifications on different wireless paging channels. For example, in one embodiment, a suitable entity such as the wireless network 121 directly notifies the mobile communication device of a paging frame of a paging cycle and time slot (paging occasion) within each assigned paging frame that is assigned to the mobile communication device 110 for delivery of paging notifications. As previously discussed, the mobile communication device 110 can be configured to monitor the wireless paging channel in the assigned time slot (paging occasion) of a respective paging frame to receive a paging notification. In such an instance, the mobile communication device need not continuously monitor the wireless paging channel.

As further discussed below, the communications 145 from the mobile communication device 110 to the second wireless network 122 notify the second wireless network and corresponding wireless base station 162 how to mitigate subsequent paging notification (or paging occasion) collisions simultaneously communicated from the first wireless base station 161 (wireless network 121) and the second wireless base station 162 (wireless network 122) to the mobile communication device 110.

FIG. 2B is an example diagram illustrating wireless paging channel adjustments according to embodiments herein.

As previously discussed, if the paging notifications are overlapping or too close in time to each other, the wireless network 122 uses the received communications 145 and corresponding timing information in communications 145 as a basis to adjust the timing of communicating subsequent paging notifications (paging occasions) as shown in graph 220 of FIG. 2B.

In one embodiment, based on timing information (and/or scheduling information such as from mobile communication device 110 or other suitable entity) associated with paging notifications communicated from the wireless network 121, the wireless network 122 and corresponding wireless base station 162 adjust the corresponding subsequent timing of communicating paging notifications 231 (or paging occasions allocated to the mobile communication device 110) over the wireless paging channel 132 such that the subsequent paging notification 231-2 (or allocated paging occasions associated with the wireless paging channel 131) and subsequent paging notification 232-2 (or allocated paging occasions associated with the wireless paging channel 132) are spaced apart in time greater than or equal to a threshold value DELTA-T as shown in graph 220. In one embodiment, via communication manager 142 and wireless base station 162, wireless network 122 notifies the mobile communication device 110 that it is assigned a different paging frame (such as paging frame 242-2) within a paging cycle and/or paging occasion in the newly assigned paging frame 242-2 such that the paging notification is sufficiently offset with the paging occasion (paging notification 231-2) in paging frame 242-1 on a subsequent cycle.

Additionally, or alternatively, the mobile communication device 110 notifies the wireless network 121 to adjust a paging frame and corresponding time slot (paging occasion) assigned to the mobile communication device 110 to receive paging notifications 151 such that they are sufficiently spaced apart in time with respect to the paging occasions on the wireless paging channel 132 (paging frame and corresponding time slot) assigned to the mobile communication device 110.

In one embodiment, the adjusted spacing of paging notifications (such as being spaced apart greater than a threshold value DELTA-T) enables the mobile communication device 110 to receive paging notifications from both the wireless paging channel 131 (for SIM 171) and wireless paging channel 132 (for SIM 172).

For example, based on increased spacing of paging notifications and paging occasions between wireless paging channels from different wireless networks, the mobile communication device 110 switches antenna hardware between receiving one or more paging notifications (via monitoring paging occasions) on the wireless paging channel 131 and receiving paging notifications (via monitoring paging occasions) on the wireless paging channel 132. In such an instance, a paging notification (paging occasion) on the wireless paging channel 131 is sufficiently spaced in time from a paging notification (paging occasion) on the wireless paging channel 132 such that the mobile communication device 110 is able to switch corresponding antenna hardware between the two wireless paging channels to receive both paging notifications.

Accordingly, as shown in graph 220 of FIG. 2B, in response to receiving the communications 145 (such as one or more messages), the second wireless base station 162 adjusts timing of the second paging notifications 152 and paging occasions to be monitored by the mobile communication device 110 based on the communications 145 received from the mobile communication device 110.

Figure 3:
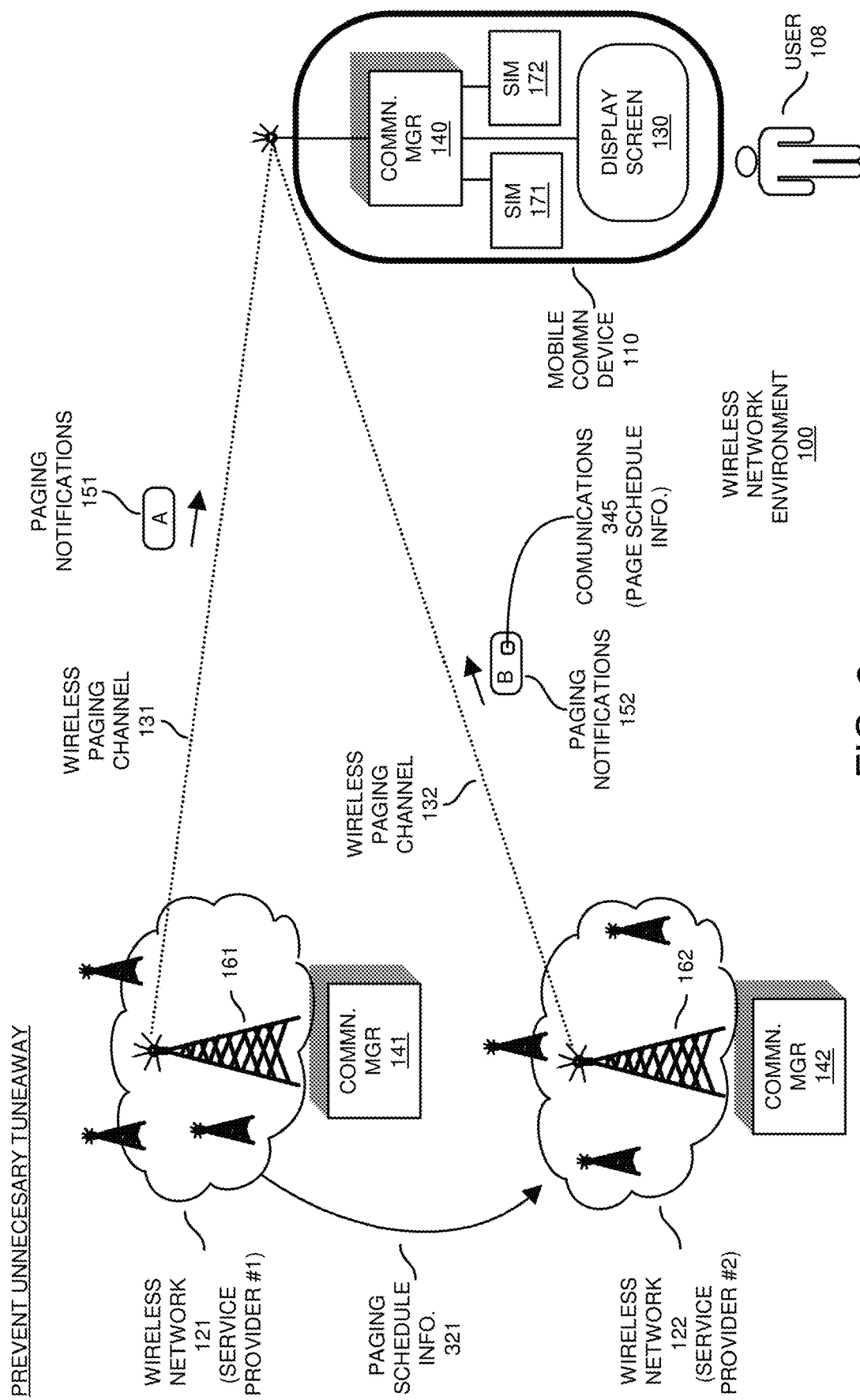
FIG. 3 is an example diagram illustrating a wireless network environment implementing wireless paging channels and corresponding techniques according to embodiments herein.

FIG. 3 is an example diagram illustrating a wireless network environment implementing wireless paging channels and corresponding techniques according to embodiments herein.

As shown in FIG. 3, wireless network environment 100 includes a first wireless network 121, a second wireless network 122, and one or more mobile communication devices (such as including mobile communication device 110).

Via wireless paging channel 131, the wireless network 121 communicates paging notifications 151 (such as paging notifications A) in respective paging occasions to one or more mobile communication devices in the wireless network environment 100.

Different portions (such as paging occasions or time slots) of the wireless paging channel 131 are assigned to different mobile communication devices in the wireless network environment 100. The different mobile communication devices monitor their assigned paging occasions or time slots of the wireless paging channel 131 for paging notifications from the wireless network 121.

Via wireless paging channel 132, the wireless network 122 communicates paging notifications 152 (such as paging notification B) in paging occasions to one or more mobile communication devices in the wireless network environment 100. Different portions (such as paging occasions or time slots) of the wireless paging channel are assigned to different mobile communication devices in the wireless network environment 100. The different mobile communication devices monitor their assigned paging occasions or time slots of the wireless paging channel 132 for paging notifications from the wireless network 122.

In one embodiment, user 108 operating mobile communication device 110 subscribes to use of both wireless network 121 and wireless network 122. For example, assume that the mobile communication device 110 is assigned a first SIM 171 (Subscriber Identity Module) from a first wireless network service provider to use the first wireless network 121 and corresponding wireless connectivity. In such an instance, at least a portion of the first paging notifications 151 (or paging occasions) communicated over wireless paging channel 131 are associated with a first SIM 171 assigned to the mobile communication device 110.

The mobile communication device 110 is also assigned a second SIM (Subscriber Identity Module) 172 provided by a second wireless network service provider to use the second wireless network 122. At least a portion of the second paging notifications 152 (paging occasions) communicated over the wireless paging channel 132 are associated with the second SIM 172 assigned to the mobile communication device 110.

In general, as previously discussed, a SIM is an integrated circuit that securely stores information such as the International Mobile Subscriber Identity (IMSI). In one embodiment, it is a memory chip disposed in respective user equipment that enables a respective user to receive and establish phone calls or wireless connectivity via the mobile communication device 110.

In this example embodiment, the wireless network 121 is operated by a first service provider (wireless network service provider #1) and includes any number of wireless base stations including wireless base station 161. Wireless base station 161 receives paging notifications directed to the mobile communication device 110 and communicates such paging notifications 151 over the wireless paging channel 131 in the wireless network environment 100.

Wireless network 122 operated by a second service provider includes any number of wireless base stations including wireless base station 162. Wireless base station 162 receives paging notifications directed to the mobile communication device 110 and communicates such paging notifications 152 over the wireless paging channel 132 in the wireless network environment 100.

As previously discussed, the mobile communication device 110 monitors a respective assigned one or more paging occasions (time slots) in repeated paging frame cycles to retrieve different paging notifications over time.

Note that the mobile communication device 110 supports individual and/or simultaneous use of the first wireless network 121 and the second wireless network 122. In one embodiment, the mobile communication device 110 switches between use of the first wireless network 121 and the second wireless network 122.

Communication of the one or more paging notifications 151 over wireless paging channel 131 informs the mobile communication device 110 of any suitable event (alert, message, command, etc.) such as that the wireless network 121 has something available for the mobile communication device 110, the mobile communication device 110 should perform a respective function, etc.

Thus, via the wireless paging channel 131, the mobile communication device 110 in the wireless network environment 100 receives first paging notifications 151 (in first allocated paging occasions) directed to the mobile communication device 110 from a first wireless base station 161 such as operated by a first wireless network service provider (service provider #1).

Note that the mobile communication device 110 also receives second paging notifications 152 (in its allocated paging occasions of the wireless paging channel 132) directed to the mobile communication device 110 from the second wireless base station 162 such as operated by a second wireless network service provider (service provider #2).

In accordance with further example embodiments, the wireless network 122 receives schedule information (such as via paging schedule information 321) regarding paging notifications scheduled to be communicated from the first wireless network 121 to the mobile communication device 110 in respective paging occasions of the wireless paging channel 131. In one embodiment, the paging schedule information 321 can include any suitable information such as which of one or more paging frames, paging cycles, paging occasions, etc., associated with the wireless paging channel 131 are scheduled to include, or not to include, a paging notification to the mobile communication device associated with SIM 171.

Thus, in one embodiment, via paging schedule information 321, the second wireless network 122 monitors a schedule of the paging notifications 151 scheduled for transmission to the mobile communication device 110 from the first wireless network 121.

Further embodiments herein include notifying the mobile communication device 110, via communications 345 from the wireless base station 162, of the paging schedule information 321 such as whether or not a paging notification is scheduled to be transmitted to the mobile communication device 110.

For example, in one embodiment, via communications 345 from the second wireless network 122 to the mobile communication device 110 such as over the wireless paging channel 132 (or other channel), the second wireless network 122 notifies the mobile communication device 110 of the schedule of one or more paging notifications 151 (or corresponding paging occasions) associated with the first wireless network 121.

If desired, the second wireless network 122 and corresponding wireless base station 162 can be configured to provide paging notifications 152 associated with the second wireless network 122 as well as paging schedule information 321 associated with the first wireless network.

As further discussed below, note that communications 345 from the wireless base station regarding the paging schedule information 321 can include any suitable information to notify the mobile communication device 110 regarding a schedule of future paging notifications (such as presence or absence of paging notifications) associated with the wireless network 121. In one embodiment, the wireless base station 162 communicates the paging schedule information 321 (or derivative information thereof) associated with the first wireless network 121 in one or more paging occasions (assigned to the mobile communication device 110) of the wireless paging channel 132 from the wireless network 122 to the mobile communication device 110.

Note that communication of the paging schedule information 321 (or corresponding information derived from the schedule information) associated with wireless paging channel 131 via communications 345 over the wireless paging channel 132 (or other suitable wireless communication channel) is useful because the mobile communication device 110 and corresponding communication management resource 140 need not switch over to monitoring the wireless paging channel 131 unless it is known that there will be a paging notification for the mobile communication device 110. For example, in one instance, the schedule information 321 indicates that no paging notifications are scheduled to be sent by the wireless network 121 to the mobile communication device 110. In such an instance, the mobile communication device 110 does not switch over to monitoring the wireless paging channel 131 because it is unnecessary.

In another instance, the schedule information 321 indicates that there is at least one paging notification scheduled to be sent by the wireless network 121 to the mobile communication device 110. In this latter instance, the mobile communication device does switch over to monitoring the wireless paging channel 131 to receive the schedule paging notification.

Thus, embodiments herein provide communication enhancements to avoid unnecessary switching (by the mobile communication device 110) between monitoring the wireless paging channel 132 of wireless network 122 and the wireless paging channel 131 of wireless network 121 when a paging notification is absent on wireless paging channel 131 from the wireless network 121.

In one embodiment, the communications 345 support a so-called 'paging skip' indication as further discussed below, although the communications 345 support communication of any suitable information.

Figure 4:
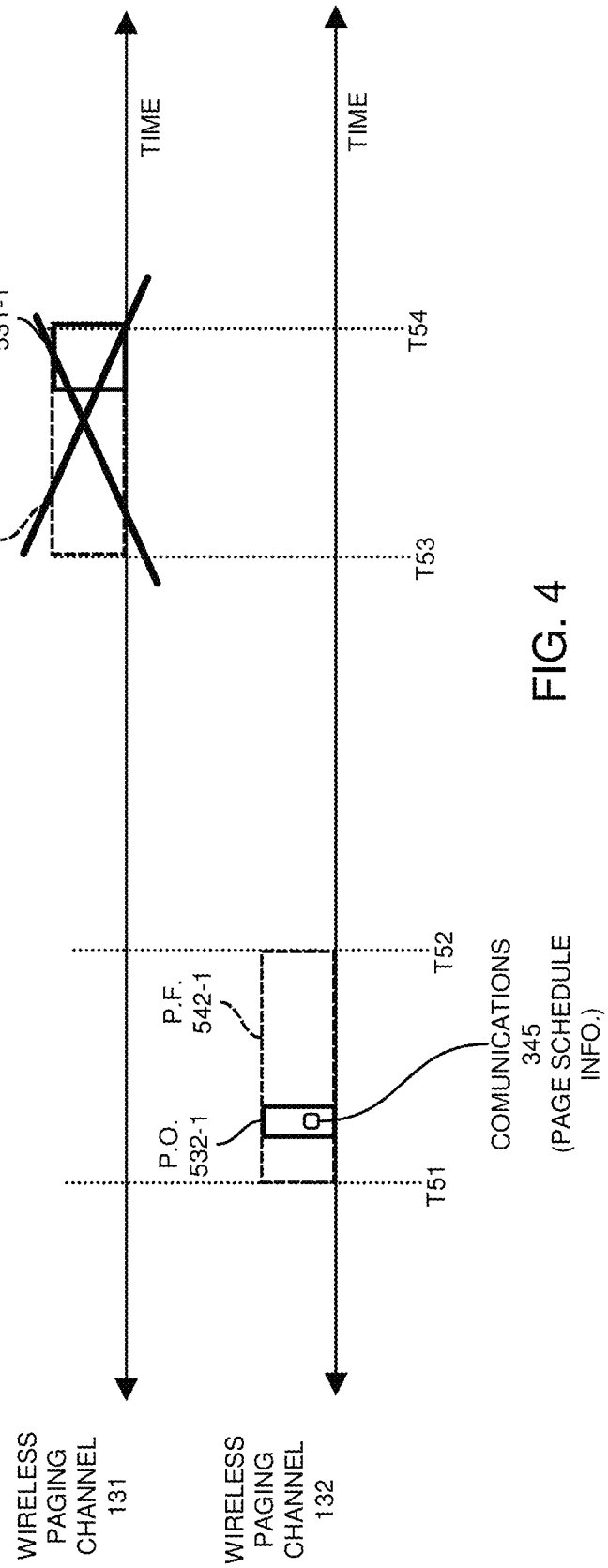
FIG. 4 is an example diagram illustrating implementation of a wireless paging channel according to embodiments herein.

FIG. 4 is an example diagram illustrating timing associated with multiple wireless paging channels according to embodiments herein.

As previously discussed, in one embodiment, the mobile communication device 110 is a MUSIM (Multi-Universal SIM) user equipment registered with both wireless networks 121 and 122. The wireless network 121 supports a first type of wireless communications to the mobile communication device 110; wireless network 122 supports a second type of wireless communications to the mobile communication device 110.

In accordance with yet further example embodiments, assume that the mobile communication device 110 monitors paging occasion 532-1 of paging frame 542-1 (between time T51 and T52) in wireless paging channel 132 and receives communications 345. Assume further that wireless network 122 (network B) informs the mobile communication device 110 of the paging notification schedule information (such as absence of one or more paging notifications) via a 'paging skip' message in communications 345 of the paging occasion 531-2 assigned to the mobile communication device 110.

In such an instance, because the mobile communication device 110 is informed that no paging notifications will be present on the wireless paging channel 131 for one or more upcoming paging occasions, paging frames, paging cycles, etc., as indicated by the communications 345, the mobile communication device 110 does not need to switch to monitoring wireless paging channel 131 associated with wireless network 121 for any possible upcoming paging frames or paging occasions (such as paging frame 541-2 and paging occasion 531-2) because it is known via communications 345 that there will be no paging notification on wireless paging channel 131 in this time slot (paging occasion) allocated to the mobile communication device 110. Based on the communications 345 in this example embodiment, the mobile communication device 110 does not switchover to monitoring the wireless paging channel 131.

In one non-limiting example embodiment, the inter-network coordination (i.e., sharing of paging notification schedule information) is implemented when both wireless network 121 and 122 use the same Access Management Function (AMF) in the core network that is responsible for the paging strategy, or if a N14 reference point is available between the AMFs of each network, or if both networks are owned by the same operator.

As a non-limiting example embodiment, communications 345 such as including a 'paging skip' indication from the wireless network 122 is transmitted using the short message paging container sent on PDCCH (Physical Downlink Control CHannel) using DCI (Downlink Control Information) Format 1_0 in NR (New Radio).

Figure 5:
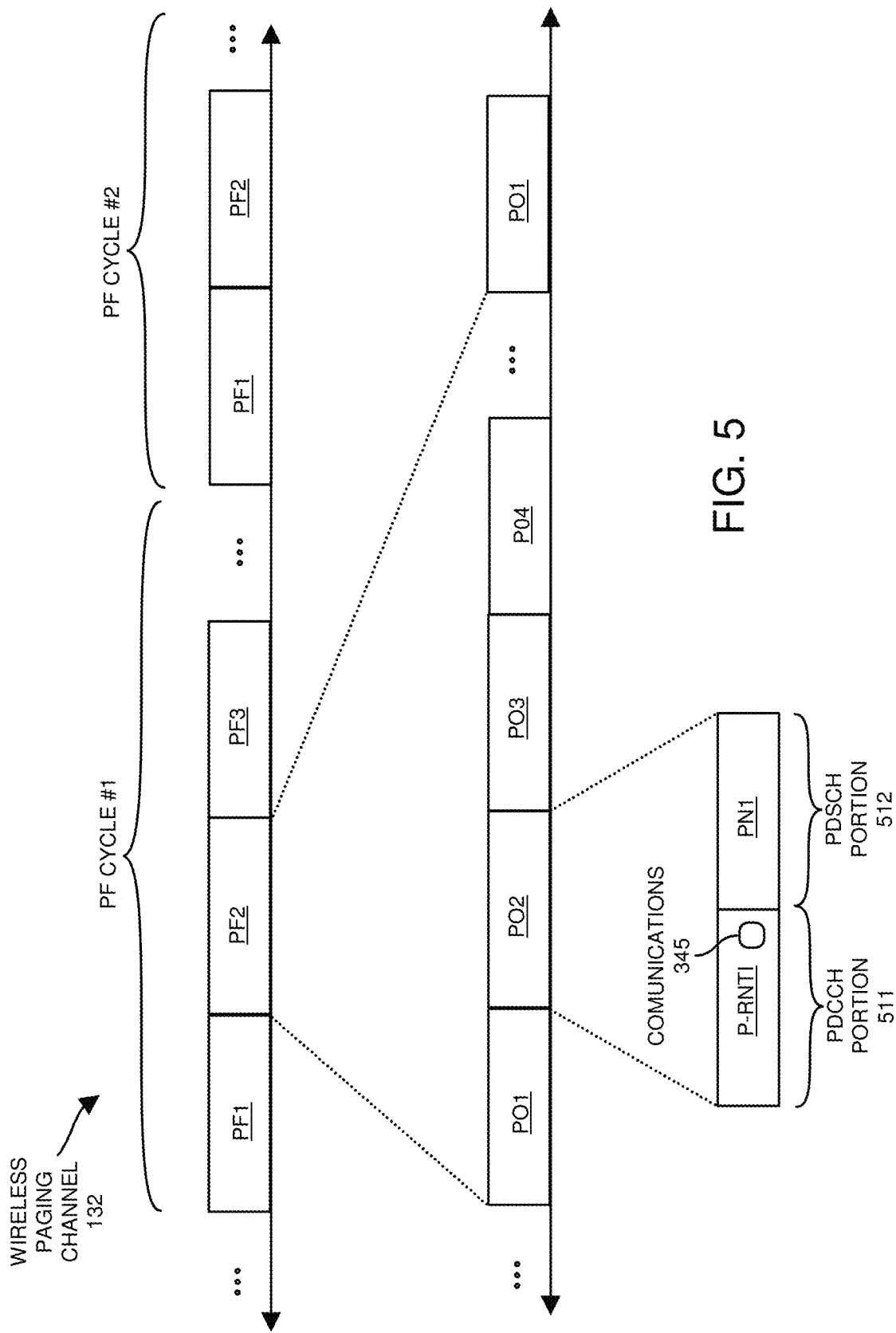
FIG. 5 is an example diagram illustrating timing associated with multiple wireless paging channels according to embodiments herein.

More specifically, in one embodiment as shown in FIG. 5, the wireless paging channel 132 includes multiple paging cycles (PF cycle #1, PF cycle #2, etc.) of repetitive paging frames (such as paging frame PF1, paging frame PF2, paging frame PF3, etc.). As further shown in FIG. 5, in accordance with further example embodiments, each paging frame of a respective paging frame cycle is partitioned into multiple time slots supporting paging occasions (PO1, PO2, PO3, PO4, etc.).

Each paging occasion potentially includes a paging notification communicated to a respective mobile communication device 110 in wireless network environment 100. Each mobile communication device in the wireless network environment 100 is assigned one or more different paging occasions to monitor for paging notifications directed to it.

In one embodiment, each paging occasion (PO) in a respective paging frame includes a PDCCH portion 511 (that stores a P-RNTI or Radio Network Temporary Identifier value, or user equipment group) and a PDSCH portion 512 (carrying user data such as a respective paging notification associated with the wireless network 122).

In this example embodiment, assume that the paging occasion PO2 of paging frame PF2 for each paging frame cycle of wireless paging channel 132 is assigned, on an as-needed basis, to convey paging notifications associated with the mobile communication device 110. In one embodiment, as previously discussed, the paging occasion PO2 includes PDCCH portion 511 and PDSCH portion 512 monitored by the mobile communication device 110.

If desired, the wireless base station 162 and/or wireless network 122 includes the communications 345 in the PDCCH portion 511 of the respective paging occasion PO2 in the wireless paging channel 132, notifying the mobile communication device 110 (assigned the paging occasion) of the schedule of paging notifications (in accordance with schedule information 321) on the wireless paging channel 131.

Accordingly, embodiments herein include providing paging schedule information 321 associated with the wireless network 121 in one or more data fields of a downlink control channel message (such as PDCCH portion 511) from the second wireless network 122 to the mobile communication device 110.

In accordance with further example embodiments, in addition to detecting communications 345 in the paging occasion PO2, note that the mobile communication device 110 monitors the PDCCH portion 511 of its assigned paging occasion PO2 to determine if there is any paging notification associated with the wireless network 122 included in the PDSCH portion 512. If yes, such as that the PDCCH portion 511 indicates presence of a paging notification, the mobile communication device 110 decodes the PDSCH portion 512 as well to determine if there is a paging notification intended for the mobile communication device 110 from the wireless network 122.

Thus, the paging occasion PO2 assigned to the mobile communication device 110 for the wireless paging channel 132 can be used to provide schedule information associated with paging notifications on the wireless paging channel 131, even though the wireless paging channel 132 is communicated by the second wireless network 122.

In one embodiment, there are at least 19 reserved bits in the downlink control information of the PDCCH portion 511 when only short message paging is used. As previously discussed, such bits (in the PDCCH portion 511) can be used to convey paging notification schedule information (communications 345 such as indicating paging skip, paging present, commands, alerts, etc., as in paging schedule information 451) associated with the wireless paging channel 131. Thus, the wireless paging channel 132 can be used for providing paging notifications associated with both the wireless network 121 and the wireless network 122.

In yet further example embodiments, two or more of the downlink control information bits are used to indicate cross-network paging schedule information such as shown in paging notification schedule information 451 of FIG. 4.

Depending on setting of bit information communicated in communications 345 to the mobile communication device 110 over the wireless paging channel 132 as indicated by the paging schedule information 451, the mobile communication device 110 learns of paging notification scheduling associated with the wireless paging channel 131 and/or wireless network 121.

For example, in one embodiment, notification to the mobile communication device 110 of the schedule of paging notifications includes: setting a data value or data field=00 in communications 345; the 00 setting notifies the mobile communication device 110 to skip all subsequent paging occasions until a next paging frame of the wireless paging channel 131 from the first wireless network 121. Skipping monitoring of the paging occasions reduces power consumed by the mobile communication device 110.

Yet further, notification to the mobile communication device 110 of the schedule of paging notifications in communications 345 includes inclusion of data value=01 in a respective data field of the PDCCH port 511, which notifies the mobile communication device 110 to skip a next paging frame of the wireless paging channel 131 due to an absence of a paging notification in that next paging frame of the wireless paging channel 131 from the first wireless network 121 to the mobile communication device 110.

Thus, the communications 345 from the second wireless network can include any suitable information informing the mobile communication device 110 not to monitor for paging notifications on the wireless paging channel 131 as none will be present.

In yet further example embodiments, a data field of the communications 345 from the second wireless network 122 can be set to indicate how many occurrences that the paging notifications from the first wireless network and corresponding wireless paging channel 131 are not scheduled for transmission from the first wireless network 121 over the wireless paging channel 131.

For example, in one embodiment, a bit value or setting of data string 10 in the communications 345 notifies the mobile communication device 110 to skip monitoring of the next two paging frames of the wireless paging channel 131 because there will be no paging notifications for the mobile communication device 110 in such frames of the wireless paging channel 131.

A bit value or setting of 11 in the communications 345 notifies the mobile communication device 110 to skip the next four paging frames of the wireless paging channel 131 because there will be no paging notifications for the mobile communication device 110 in such paging frames.

Note again that the message information in communications 345 can include any suitable information. For example, in one embodiment, the communications 345 (notification) to the mobile communication device 110 can be configured to indicate an upcoming paging notification scheduled for transmission from the first wireless network 121 to the mobile communication device 110. In such an instance, the mobile communication device 110 is notified via communications 345 (over the wireless paging channel 132) of the presence of a future scheduled paging notification to the mobile communication device 110 over the wireless paging channel 132. In response to receiving the notification that a paging notification will be present on the wireless paging channel 131, the mobile communication device 132 switches over to at least temporarily monitoring the wireless paging channel 131.

Figure 6:
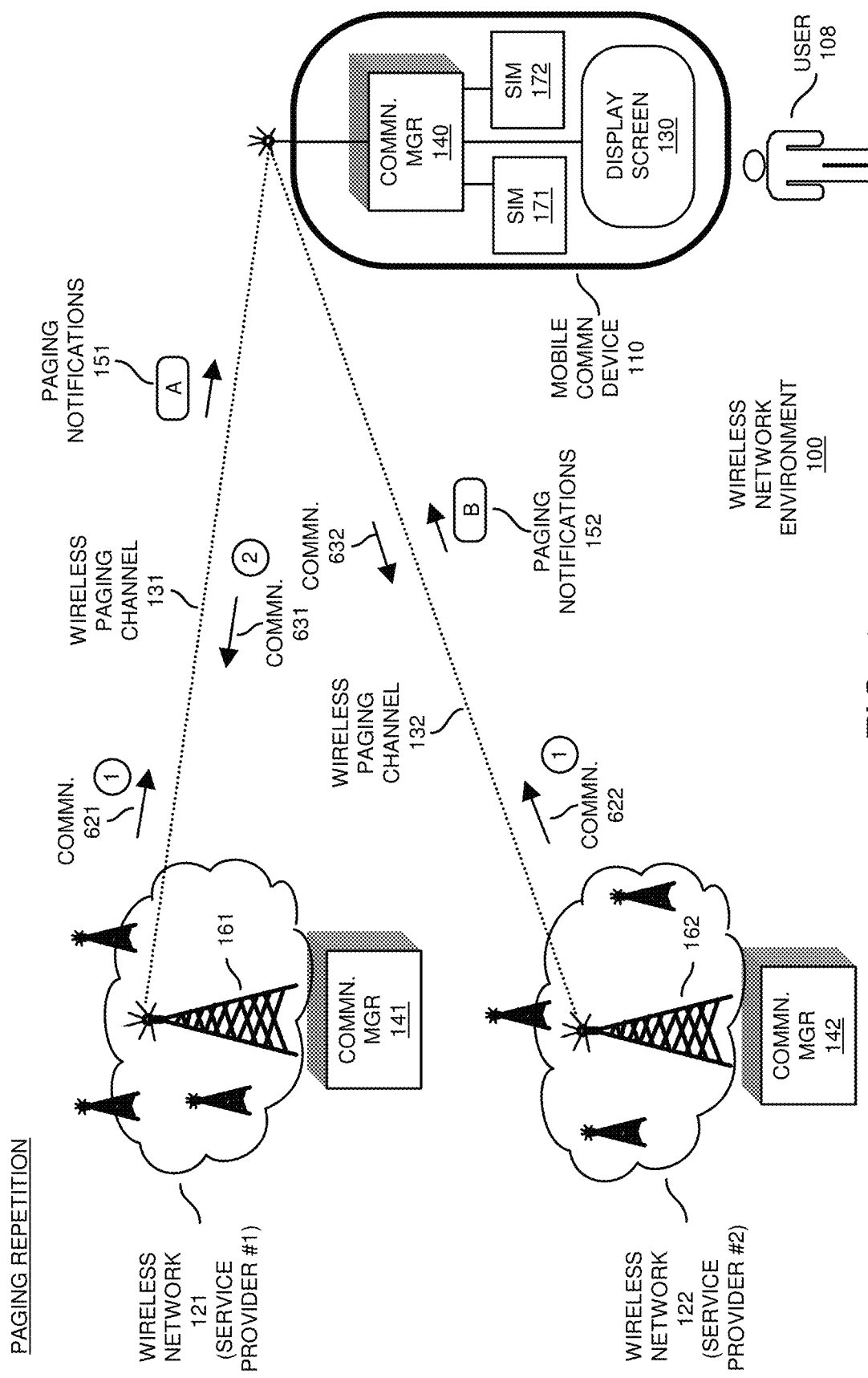
FIG. 6 is an example diagram illustrating a wireless network environment implementing wireless paging channels and corresponding techniques according to embodiments herein.

FIG. 6 is an example diagram illustrating a wireless network environment implementing wireless paging channels and corresponding techniques according to embodiments herein.

As shown in FIG. 6, wireless network environment 100 includes a first wireless network 121, a second wireless network 122, and one or more mobile communication devices (such as including mobile communication device 110).

Via wireless paging channel 131, the wireless network 121 communicates paging notifications 151 in respective paging occasions to one or more mobile communication devices in the wireless network environment 100.

Via wireless paging channel 132, the wireless network 122 communicates paging notifications 152 in paging occasions to one or more mobile communication devices in the wireless network environment 100.

In one embodiment, user 108 operating mobile communication device 110 subscribes to use of both wireless network 121 and wireless network 122. For example, assume that the mobile communication device 110 is assigned a first SIM 171 (Subscriber Identity Module) from a first wireless network service provider to use the first wireless network 121 and corresponding wireless connectivity. In such an instance, at least a portion of the first paging notifications 151 (or paging occasions) communicated over wireless paging channel 131 are associated with a first SIM 171 assigned to the mobile communication device 110.

The mobile communication device 110 is also assigned a second SIM (Subscriber Identity Module) 172 provided by a second wireless network service provider to use the second wireless network 122. At least a portion of the second paging notifications 152 (paging occasions) communicated over the wireless paging channel 132 are associated with the second SIM 172 assigned to the mobile communication device 110.

In general, a SIM is an integrated circuit that securely stores information such as the International Mobile Subscriber Identity (IMSI). In one embodiment, it is a memory chip disposed in respective user equipment that enables a respective user to receive and establish phone calls or wireless connectivity via the mobile communication device 110.

In this example embodiment, the wireless network 121 is operated by a first service provider (wireless network service provider #1) and includes any number of wireless base stations including wireless base station 161. Wireless base station 161 receives paging notifications directed to the mobile communication device 110 and communicates such paging notifications 151 over the wireless paging channel 131 in the wireless network environment 100.

Wireless network 122 operated by a second service provider includes any number of wireless base stations including wireless base station 162. Wireless base station 162 receives paging notifications directed to the mobile communication device 110 and communicates such paging notifications 152 over the wireless paging channel 132 in the wireless network environment 100.

Via SIM 171 and SIM 172, note that the mobile communication device 110 supports individual and/or simultaneous use of the first wireless network 121 and the second wireless network 122. In one embodiment, the mobile communication device 110 switches between use of the first wireless network 121 and the second wireless network 122. Communication of the one or more paging notifications 151 over wireless paging channel 131 informs the mobile communication device 110 of any suitable event (alert, message, command, etc.) such as that the wireless network 121 has something available for the mobile communication device 110, the mobile communication device 110 should perform a respective function, etc.

As a more specific example, via the wireless paging channel 131, the mobile communication device 110 in the wireless network environment 100 receives first paging notifications 151 directed to the mobile communication device 110 from a first wireless base station 161 such as operated by a first wireless network service provider (service provider #1). The mobile communication device 110 also receives second paging notifications 152 directed to the mobile communication device 110 from the second wireless base station 162 such as operated by a second wireless network service provider (service provider #2).

In accordance with further example embodiments, via communications 621 the wireless base station 161 notifies the mobile communication device 110 that the wireless network 121 supports paging repetition as described herein. Via communications 622 the wireless base station 162 notifies the mobile communication device 110 that the wireless network 121 supports paging repetition as described herein.

Additionally, or alternatively, the mobile communication device 110 can determine based on prior history that the wireless network 121 supports a paging repetition mode and that wireless network 122 supports a paging repetition mode.

Assume that the communication manager 140 of the mobile communication device 110 would like to operate in a repetition paging mode for both paging notifications from the first wireless network 121 and the second wireless network 122. In such an instance, via communications 631, the communication manager 140 of the mobile communication device 110 notifies the wireless network 121 to provide so-called paging repetition associated with the wireless paging channel 131; via communications 632, the communication manager 140 of the mobile communication device 110 notifies the wireless network 122 to provide so-called paging repetition associated with the wireless paging channel 132.

In one embodiment, the communications 631 (such as input) further notify the wireless base station 161 and corresponding first wireless network 121 that the mobile communication device 110 supports connectivity with both the first wireless network 121 and another wireless network such as wireless network 122. In other words, in one embodiment, the mobile communication device 110 notifies the wireless network 121 that it is a MUSIM (Multi-Universal SIM) device.

In accordance with further example embodiments, in response to receiving the input (such as via communications 631) from mobile communication device 110 (or other suitable entity) that the mobile communication device 110 is a multi-SIM device supporting connectivity to multiple different wireless networks and/or that the first wireless network 121 is to operate the wireless paging channel 131 in the paging repetition mode for the mobile communication device 110, the first wireless network 121 allocates multiple paging occasions on the wireless paging channel 131 for use by the mobile communication device to receive one or more paging notifications 151 from the wireless network 121.

Further, in response to receiving the input (such as via communications 632) from mobile communication device 110 (or other suitable entity) that the mobile communication device 110 is a multi-SIM device supporting connectivity to multiple different wireless networks and/or that the second wireless network 122 is to operate the wireless paging channel 131 in the paging repetition mode for the mobile communication device 110, the first wireless network 121 allocates multiple paging occasions on the wireless paging channel 131 for use by the mobile communication device to receive one or more paging notifications 151 from the wireless network 121.

In one embodiment, the communications 631 from the mobile communication device 110 to the wireless network 121 include a request from the mobile communication device 110 notifying the first wireless network 121 to support a specific type of paging notifications (such as paging repetition) over the wireless paging channel 131 of the first wireless network. The communications 632 from the mobile communication device 110 to the wireless network 122 include a request from the mobile communication device 110 notifying the second wireless network 122 to support a specific type of paging notifications (such as paging repetition) over the wireless paging channel 132 of the first wireless network.

Note that each of the wireless network 121 and wireless network 122 provides wireless connectivity to multiple mobile communication devices, some of which do not require a paging repetition mode as described herein. For those single SIM devices, the wireless paging channel 131 supports conventional paging in which the wireless network 121 assigns a single paging frame and corresponding paging occasion in a cycle in which to notify the single SIM mobile communication devices of respective paging notifications. As previously discussed, the increased number of paging notifications to the mobile communication device 110 (because it is a multi-SIM device) ensure that the mobile communication device 110 is able to receive its paging notifications.

Figure 7:
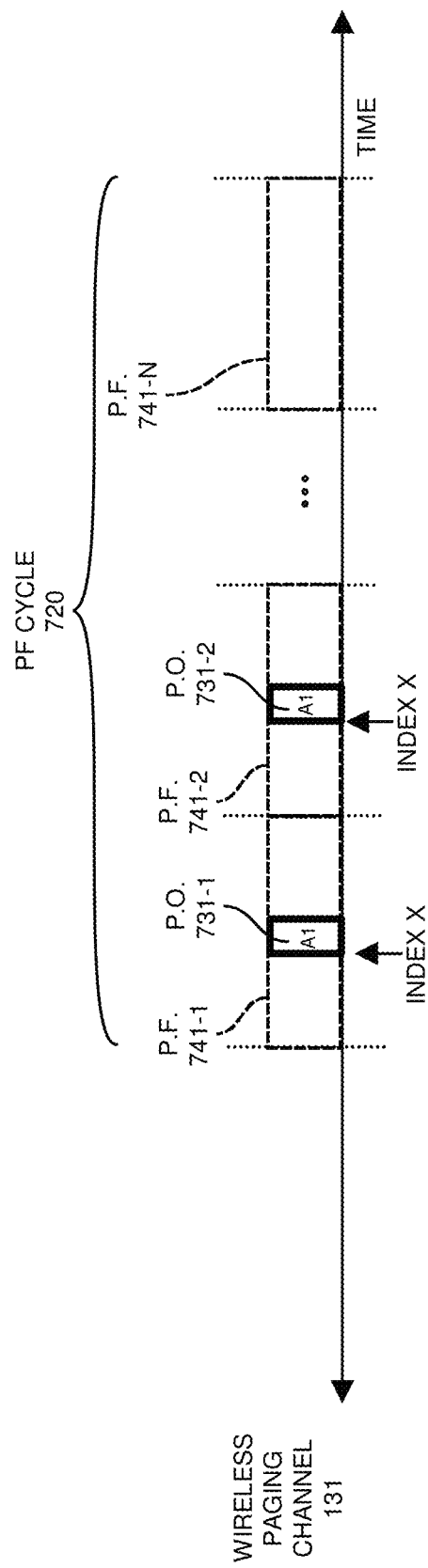
FIG. 7 is an example timing diagram illustrating repetition of paging notifications in a paging channel according to embodiments herein.

FIG. 7 is an example timing diagram illustrating repetition of paging notifications in a paging channel according to embodiments herein.

In response to receiving input indicating to operate the wireless paging channel 131 in the paging notification repetition mode, the first wireless network 121 allocates multiple paging occasions in a respective paging frame cycle 720 of the wireless paging channel 131 to the mobile communication device 110.

In one embodiment, the mobile communication device 110 and/or the respective wireless network are both aware of the paging structure (paging occasions) that are to be monitored by the mobile communication device 110 when operating in a multiple-SIM mode. For example, in one embodiment, additional paging occasions are allocated for use by the mobile communication device 110 to receive a respective paging notification.

As a more specific example, in response to operating the mobile communication device in multi-SIM mode, assume that the wireless network 121 allocates the paging occasion 731-1 in paging frame 741-1 and the paging occasion 731-2 in paging frame 741-2 in paging cycle 720 to the mobile communication device 110 to receive a respective paging notification A1.

In such an instance, the multiple paging occasions on the wireless paging channel 131 of the first wireless network 121 include a first paging occasion 731-1 and a second paging occasion 731-2. The first paging occasion 731-1 is present in a first paging frame 741-1 of the wireless paging channel 131; the second paging occasion 731-2 is present in a second paging frame 741-2 of the wireless channel 131. Repetition of the given paging notification A1 includes: i) encoding the first paging occasion 731-1 to include the given paging notification A1, and ii) encoding the second paging occasion 731-2 to include the given paging notification A1.

In one nonlimiting example embodiment, after detecting presence of a paging notification in the monitored paging occasions, the mobile communication device 110 can discontinue monitoring the other paging occasions associated with the paging repetition mode. For example, if the wireless network 121 detects that the mobile communication device 110 received the paging notification A1 in paging occasion 731-1, the wireless network 121 does not transmit the paging notification A1 again in paging occasion 731-2.

Conversely, if the wireless network 121 does not detect that the mobile communication device 110 received the paging notification A1 in paging occasion 731-1, the wireless network 121 transmits the paging notification A1 again in paging occasion 731-2. Thus, embodiments herein include encoding the second paging occasion 731-2 to include the given paging notification A1 in response to detecting that the mobile communication device 110 missed receiving the given paging notification in the first paging occasion 731-1.

Thus, in one embodiment, via the wireless paging channel 131, in accordance with the paging repetition mode, the mobile communication device 110 is allocated multiple paging occasions, each in a different paging frame of the repeating corresponding paging cycles.

As previously discussed, the repetition of given paging notification A1 in multiple different paging occasions of the wireless paging channel 131 ensures that the mobile communication device 110 is able to receive the given paging notification A1 even if the mobile communication device 110 happens to miss receiving the given notification A1 in one of the allocated paging occasions. In one embodiment, the repetition of the given paging notification A1 allows the mobile communication device 110 to temporarily tune-away to a second wireless network 121 and return to monitoring the wireless paging channel 131 of the first wireless network 121 in sufficient time to detect at least one rendition of the given paging notification A1.

Note that the number of paging occasions assigned to the mobile communication device 110 can vary depending on the embodiment. For example, if desired, the mobile communication device 110 can be allocated more than 2 paging occasions in each respective paging cycle.

Figure 8:
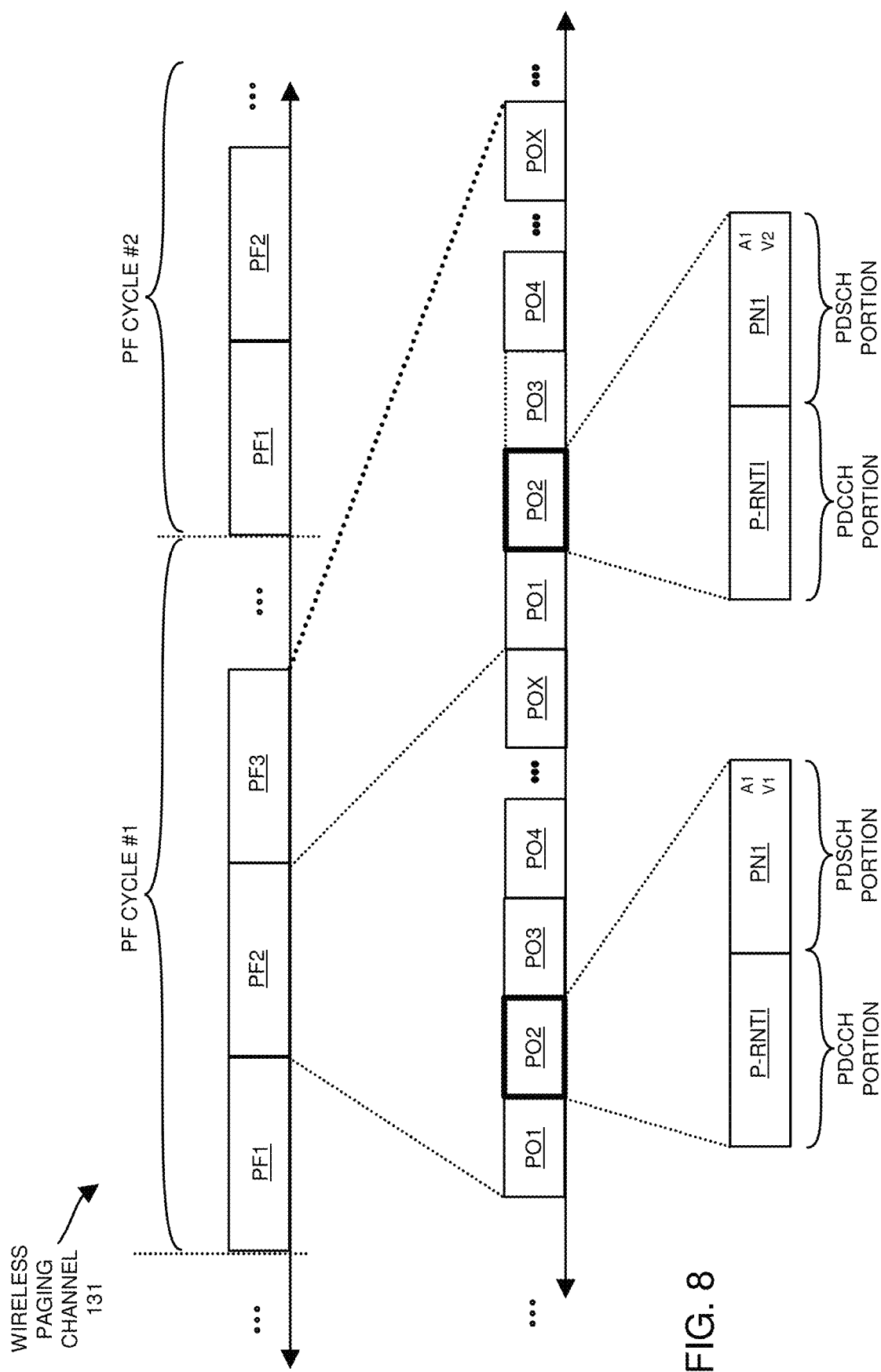
FIG. 8 is an example timing diagram illustrating repetition of paging notifications in a paging channel according to embodiments herein.

FIG. 8 is an example timing diagram illustrating repetition of paging notifications in a paging channel according to embodiments herein.

As previously discussed, embodiments herein include reducing paging collisions/conflicts between network 121 and wireless network 122 via repetitive paging notifications in either or both networks. In one embodiment, the paging repetition mode is implemented for mobile communication devices that support multiple SIMs.

As previously discussed, any suitable method can be used to notify the respective wireless network that the mobile communication device is a multi-SIM mobile communication device.

In one embodiment, if the communication manager 141 (such as gNB) associated with the wireless network 121 identifies that the mobile communication device 110

(MUSIM UE) has missed a paging message A1, the communication manager 141 resends the paging message in the next available PF (and at the same PO index offset such as index offset=X). The wireless base station 161 repeats paging notification A1 any number of times (such as Rivero, a configurable number of paging repetition for which the MUSIM UE is also aware of).

In such an instance, the behavior of the MU SIM UE is as follows: after the UE determines that it'd miss the first assigned paging occasion, it attempts to monitor the paging occasion of the next paging frame, unless the mobile communication device 110 has missed more than R consecutive paging frames. If the MUSIM UE monitors and detects the originally-assigned paging occasion in a paging frame, the UE skips monitoring of subsequent paging occasions until the next assigned paging frame (i.e., the mobile communication device skips any paging frames that were assigned for paging repetition after detecting).

In this example embodiment, the wireless paging channel 131 includes multiple paging frames PF1, PF2, PF3, etc., per paging frame cycle (such as paging frame cycle PF1, paging frame cycle PF2, etc.). The mobile communication device 110 is assigned paging occasion PO2 in paging frame PF2 and paging occasion PO2 in paging frame PF3 for each of multiple paging frame cycle (such as paging frame cycle #1, paging frame cycle #2, etc.). In a manner as previously discussed, the mobile communication device 110 monitors for presence of the paging notification A1 in the multiple assigned paging occasions of the paging frame cycle #1; the mobile communication device 110 monitors for presence of the paging notification A1 in the multiple assigned paging occasions of the paging frame cycle #2; and so on.

In accordance with further example embodiments, each of the paging occasions that includes a respective paging notification to the mobile communication device 110 also includes an index value such as value V1, value V2, etc.

In one embodiment, the respective index value indicates a paging repetition value indicating the order of occurrence of the paging notification. More specifically, value V1 indicates that the paging notification A1 in paging occasion PO2 of paging frame PF2 of paging frame cycle #1 is a first occurrence of the paging notification A1 in a paging notification repetition sequence; value V2 indicates that the paging notification A1 in paging occasion PO2 of paging frame PF3 of paging frame cycle #1 is a second occurrence of the paging notification A1 of the paging notification repetition sequence; and so on.

In this manner, the mobile communication device 110 is made aware of the specific location of each respective paging notification in a sequence of receiving the repetition of paging notifications A1 and whether any are missed.

Figure 9:
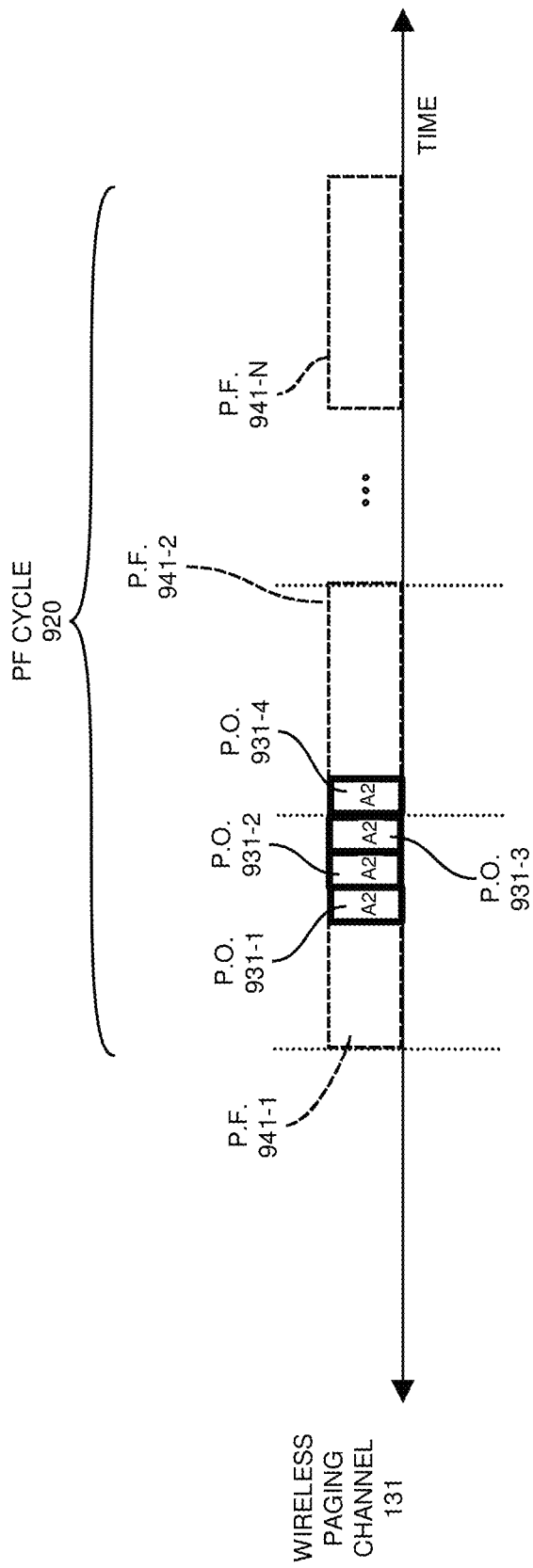
FIG. 9 is an example timing diagram illustrating repetition of paging notifications in a paging channel according to embodiments herein.

FIG. 9 is an example timing diagram illustrating repetition of paging notifications in a paging channel according to embodiments herein.

In yet further embodiments, the multiple paging occasions assigned to the mobile communication device 110 during paging repetition mode include a first paging occasion and a second paging occasion in a single (or same) paging frame of the wireless paging channel 131. In such an embodiment, repeating the given paging notification includes: i) encoding the paging occasion 931-1 in the paging frame 941-1 to include the given paging notification A2, and ii) encoding the paging occasion 941-2 in paging frame 941-2 to include the given paging notification A2, iii) encoding the paging occasion 931-1 in the paging frame 941-1 to include the given paging notification A2, and iv) encoding the second paging occasion 941-2 in paging frame 941-2 to include the given paging notification A2.

In accordance with further example embodiments, any of one or more paging occasions assigned or allocated to the mobile communication device 110 is contiguous with each other. For example, in this example embodiment, the paging occasion 1030-1 is contiguous with the paging occasion 1030-2; the paging occasion 1030-2 is contiguous with the paging occasion 1030-3; and so on.

Figure 10:
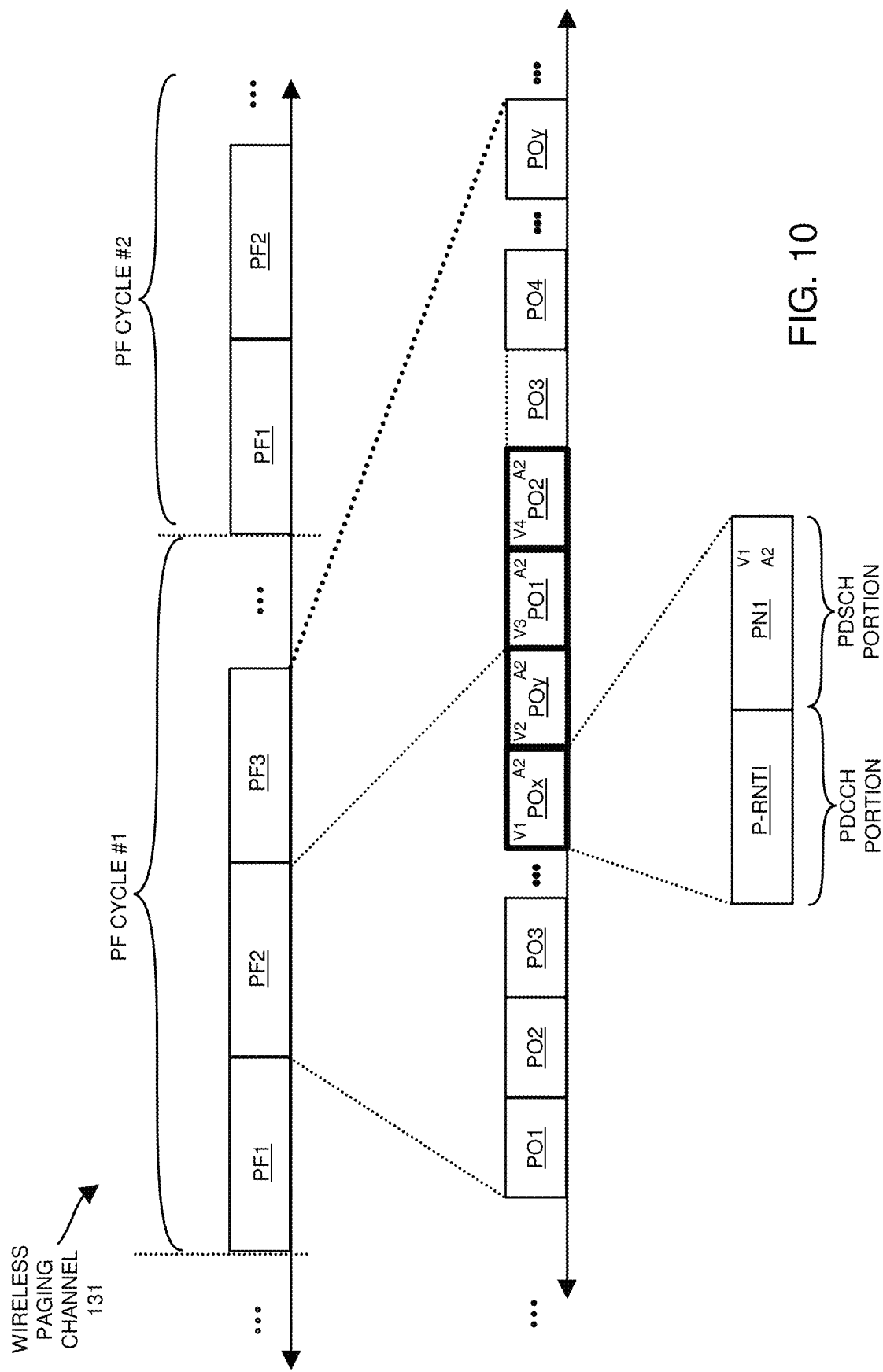
FIG. 10 is an example timing diagram illustrating repetition of paging notifications in a paging channel according to embodiments herein.

FIG. 10 is an example timing diagram illustrating repetition of paging notifications in a paging channel according to embodiments herein.

In one embodiment, the paging repetition occurs for a number R consecutive paging occasions (such as either in the same paging frame and/or the immediately next paging frame, depending on the PO index). In one embodiment, within each paging repetition (repeated paging notification message), there may be an identifier value (such as V1, V2, V3, V4) which indicates the order of the paging message in the R consecutive paging occasions. For example, the UE may later use this identifier in order to tune its receiver hardware to the subsequent paging messages.

In one embodiment, if the time between two immediate paging occasions is less than the amount of time for the communication manager 141 (gNB) of wireless network 121 to find out if the mobile communication device 110 (such as a MUSIM UE) has missed the originally-assigned paging occasion, then the communication manager 141 (gNB) may irrespectively repeat the paging for the mobile communication device 110 in R consecutive paging occasions. After the mobile communication device 110 monitors and detects a paging notification A2 in the originally-assigned paging occasion, the mobile communication device skips monitoring the subsequent paging occasions.

In accordance with further example embodiments, to enable a communication manager 141 (gNB) to balance the number of paging messages across multiple consecutive paging occasions, a mobile communication device (UE) may be configured to monitor the R consecutive paging occasions until it either has detected its ue_Identity (that matches its fulll-RNTI if in RRC_INACTIVE, or the UE identity allocated by upper layers in RRC_IDLE) in any PagingRecords of the detected paging message or it has exhausted monitoring all the R consecutive paging occasions starting from the originally assigned paging occasion.

Alternatively, paging repetition may occur in R consecutive PDCCH monitoring occasions (PMOs) of the originally assigned paging occasion and the next following paging occasion.

In yet further example embodiments, to enable a communication manager 141 (gNB) to balance the number of paging messages across multiple consecutive PMOs, a MUSIM UE may be configured to monitor the R consecutive paging monitoring occasions or until it has detected its ue_Identity.

Note again that the above paging repetition methods (such as paging repetition mode) can be requested by the mobile communication device 110 such as after the mobile communication device 110 has identified a high chance of paging collisions or paging conflicts receiving paging notifications from one or both wireless networks to which it has been provisioned for use.

As further shown in FIG. 10, the paging frame cycle #1 of the wireless paging channel 131 includes paging frame PF1, paging frame PF2, paging frame PF3, etc. Each paging frame includes paging occasion PO1, PO2, PO3, . . . , Pox, and POy. The mobile communication device 110 is allocated used of a set of paging occasions in each paging frame cycle as below.

For example, in one embodiment, the mobile communication device 110 is assigned use of R=4 paging occasions in paging frame cycle #1 including i) paging occasion POx of paging frame PF2 in paging frame cycle #1, ii) paging occasion POy of paging frame PF2 in paging frame cycle #1, iii) paging occasion PO1 of paging frame PF3 in paging frame cycle #1, iv) paging occasion PO2 of paging frame PF3 in paging frame cycle #1.

In a similar manner, the mobile communication device 110 is assigned use of R=4 paging occasions in paging frame cycle #2 including i) paging occasion POx of paging frame PF2 in paging frame cycle #2, ii) paging occasion POy of paging frame PF2 in paging frame cycle #2, iii) paging occasion PO1 of paging frame PF3 in paging frame cycle #2, iv) paging occasion PO2 of paging frame PF3 in paging frame cycle #2.

In accordance with further example embodiments, each of the consecutive paging occasions that includes a respective paging notification (such as A2) to the mobile communication device 110 also includes an index value such as value V1, value V2, value V3, value V4, etc.

In one embodiment, the index value indicates a paging repetition value indicating the order of occurrence of the paging notification. More specifically, value V1 indicates that the paging notification A2 in paging occasion POx of paging frame PF2 of paging frame cycle #1 is a first occurrence of the repetition associated with paging notification A2 in the paging notification repetition sequence; value V2 indicates that the paging notification A2 in paging occasion POy of paging frame PF2 of paging frame cycle #1 is a second occurrence of the paging notification A2 in the paging notification repetition sequence; value V3 indicates that the paging notification A2 in paging occasion PO1 of paging frame PF3 of paging frame cycle #1 is a third occurrence of the paging notification A2 in the paging notification repetition sequence; value V4 indicates that the paging notification A2 in paging occasion PO2 of paging frame PF3 of paging frame cycle #1 is a fourth occurrence of the paging notification A2 in the paging notification repetition sequence; and so on. In this manner, the mobile communication device 110 is made aware of the specific location of a respective paging notification in a sequence of a repetition of receiving the paging notifications A2 and whether any are missed.

Figure 11:
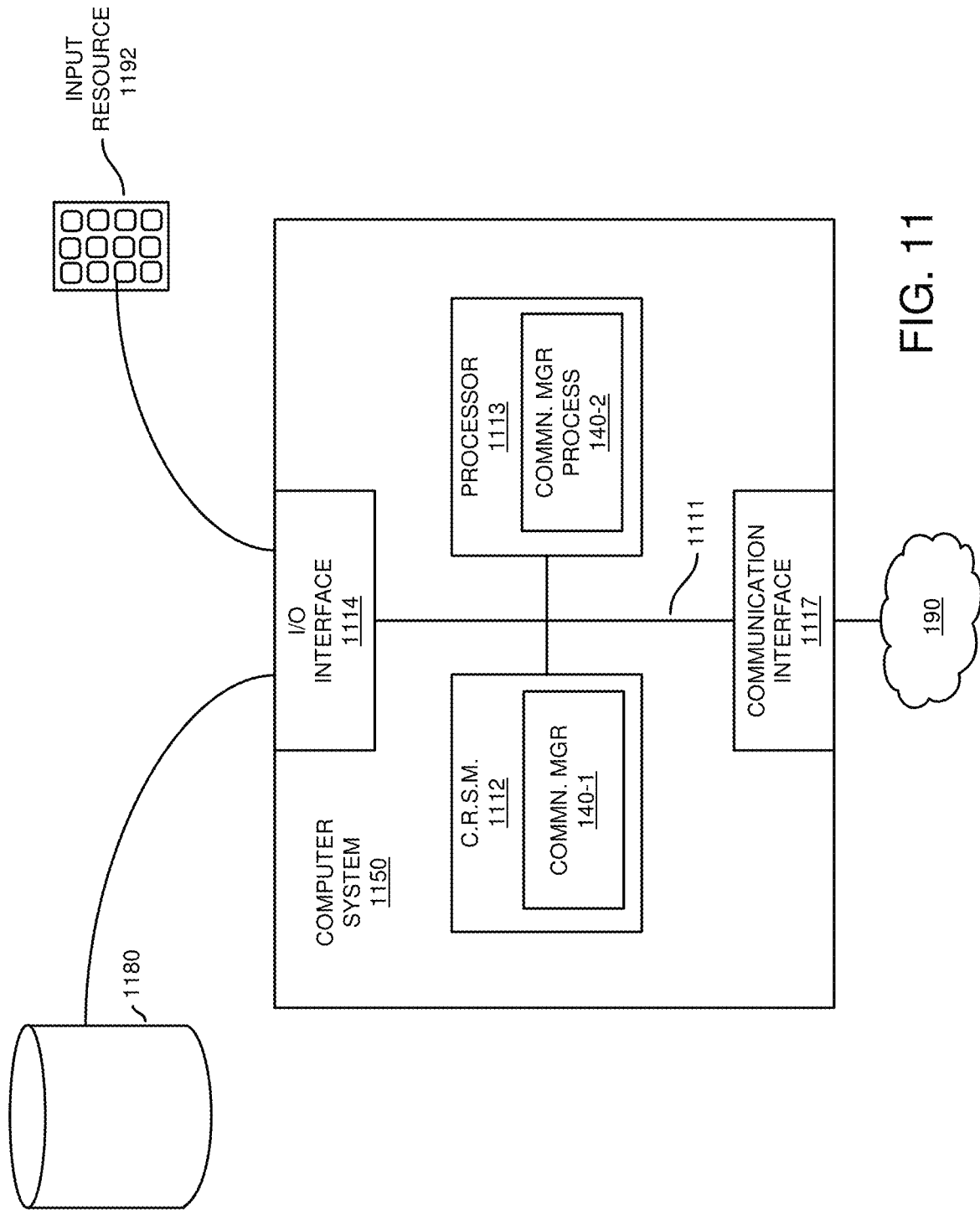
FIG. 11 is an example diagram illustrating example computer hardware and software operable to execute one or more operations according to embodiments herein.

FIG. 11 is an example block diagram of a computer system for implementing any of the operations as previously discussed according to embodiments herein.

Any of the resources (such as communication manager 140, communication manager 141, user equipment 160, wireless base station 160, etc.) as discussed herein can be configured to include computer processor hardware and/or corresponding executable instructions to carry out the different operations as discussed herein.

As shown, computer system 1150 of the present example includes interconnect 1111 coupling computer readable storage media 1112 such as a non-transitory type of media (which can be any suitable type of hardware storage medium in which digital information can be stored and or retrieved), a processor 1113 (computer processor hardware), I/O interface 1114, and a communications interface 1117.

I/O interface(s) 1114 supports connectivity to repository 1180 and input resource 1192.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with communication manager application 140-1 (e.g., including instructions) in a respective wireless station to carry out any of the operations as discussed herein.

During operation of one embodiment, processor 1113 accesses computer readable storage media 1112 via the use of interconnect 1111 in order to launch, run, execute, interpret or otherwise perform the instructions in communication manager application 140-1 stored on computer readable storage medium 1112. Execution of the communication manager application 140-1 produces communication manager process 140-2 to carry out any of the operations and/or processes as discussed herein.

Those skilled in the art will understand that the computer system 1150 can include other processes and/or software and hardware components, such as an operating system that controls allocation and use of hardware resources to execute communication manager application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1150 may reside at any location or can be included in any suitable resource in any network environment to implement functionality as discussed herein.

Functionality supported by the different resources will now be discussed via flowcharts in FIGS. 12, 13, and 14. Note that the steps in the flowcharts below can be executed in any suitable order.

Figure 12:
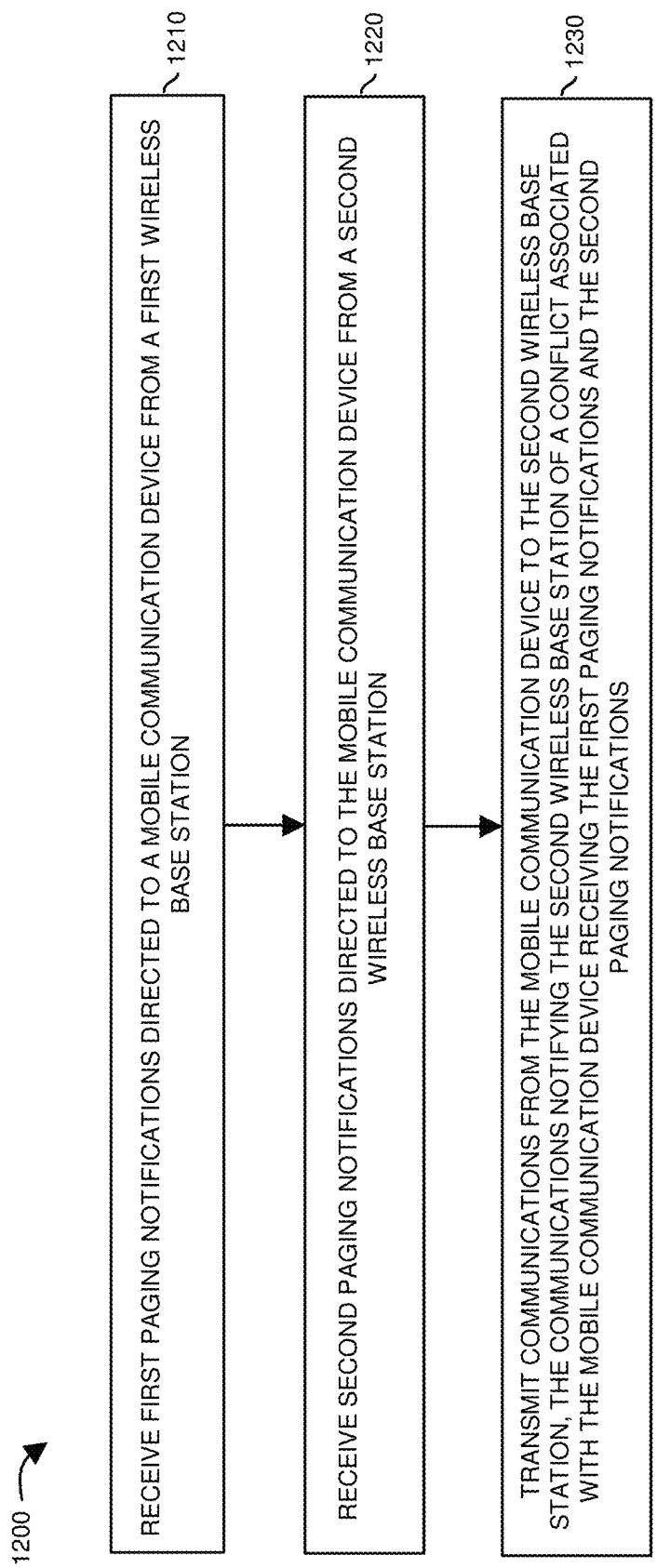
FIG. 12 is an example diagram illustrating a method according to embodiments herein.

FIG. 12 is an example diagram illustrating a method according to embodiments herein. Note that there will be some overlap with respect to concepts as discussed above.

In processing operation 1210 of flowchart 1200, the mobile communication device receives first paging notifications 151 directed to a mobile communication device 110 from a first wireless base station 161 in the wireless network 121 operated by service provider #1.

In processing operation 1220, the mobile communication device 110 receives second paging notifications 152 directed to the mobile communication device 110 from a second wireless base station 162 in the wireless network 122 operated by service provider #2.

In processing operation 1230, the communication management 140 transmits communications 145 from the mobile communication device 110 to the second wireless base station 162. The communications 145 notify the second wireless base station 162 of a conflict associated with the mobile communication device 110 receiving the first paging notifications 151 and the second paging notifications 152.

Figure 13:
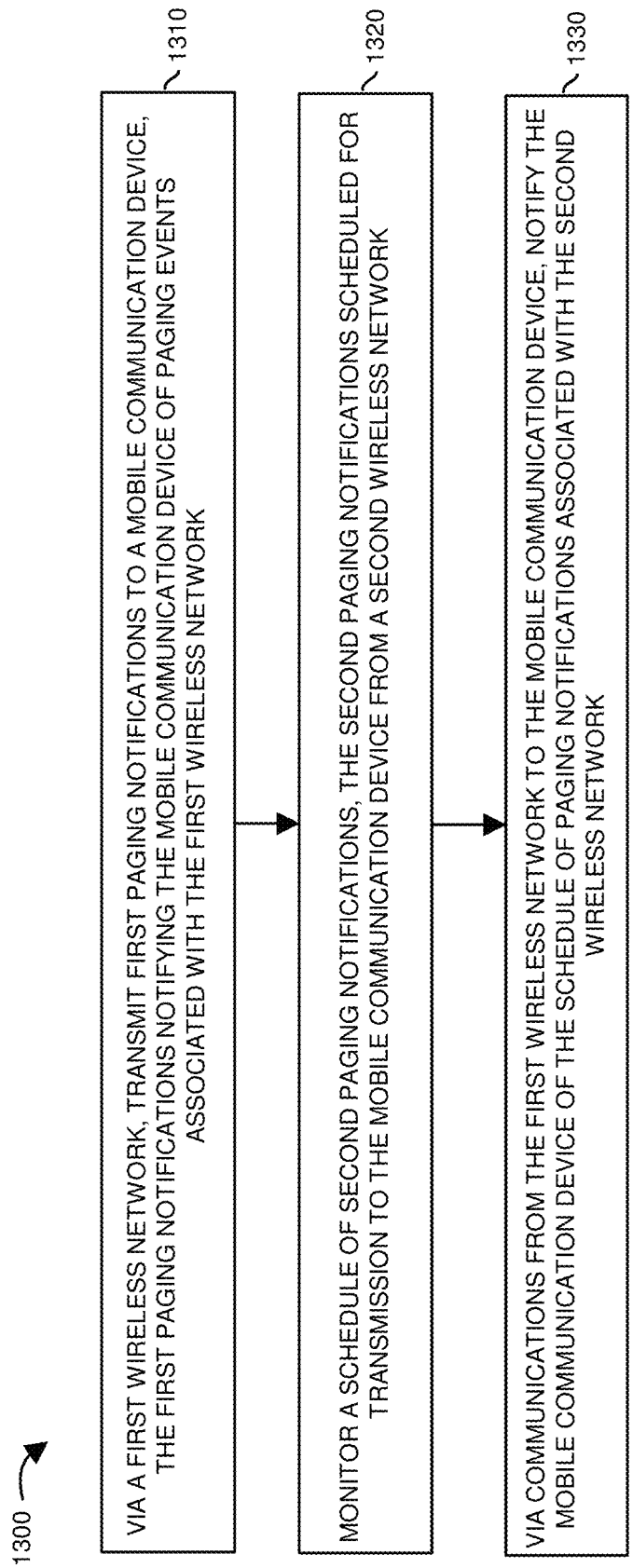
FIG. 13 is an example diagram illustrating a method according to embodiments herein.

FIG. 13 is an example diagram illustrating a method according to embodiments herein. Note that there will be some overlap with respect to concepts as discussed above.

In processing operation 1310 of flowchart 1300, the wireless base station 162 of the second first wireless network 122 transmits paging notifications 152 to the mobile communication device 110. The paging notifications 152 notify the mobile communication device 110 of paging events associated with the wireless network 122.

In processing operation 1320, the wireless network 122 monitors a schedule of paging notifications 151 associated with wireless network 121. The paging notifications 151 are scheduled for transmission/distribution to the mobile communication device 110 from the first wireless network 121.

In processing operation 1330, via communications 345 from the wireless network 122 to the mobile communication device 110, the wireless base station 162 notifies the mobile communication device 110 of the schedule of paging notifications 151 associated with the wireless network 121.

Figure 14:
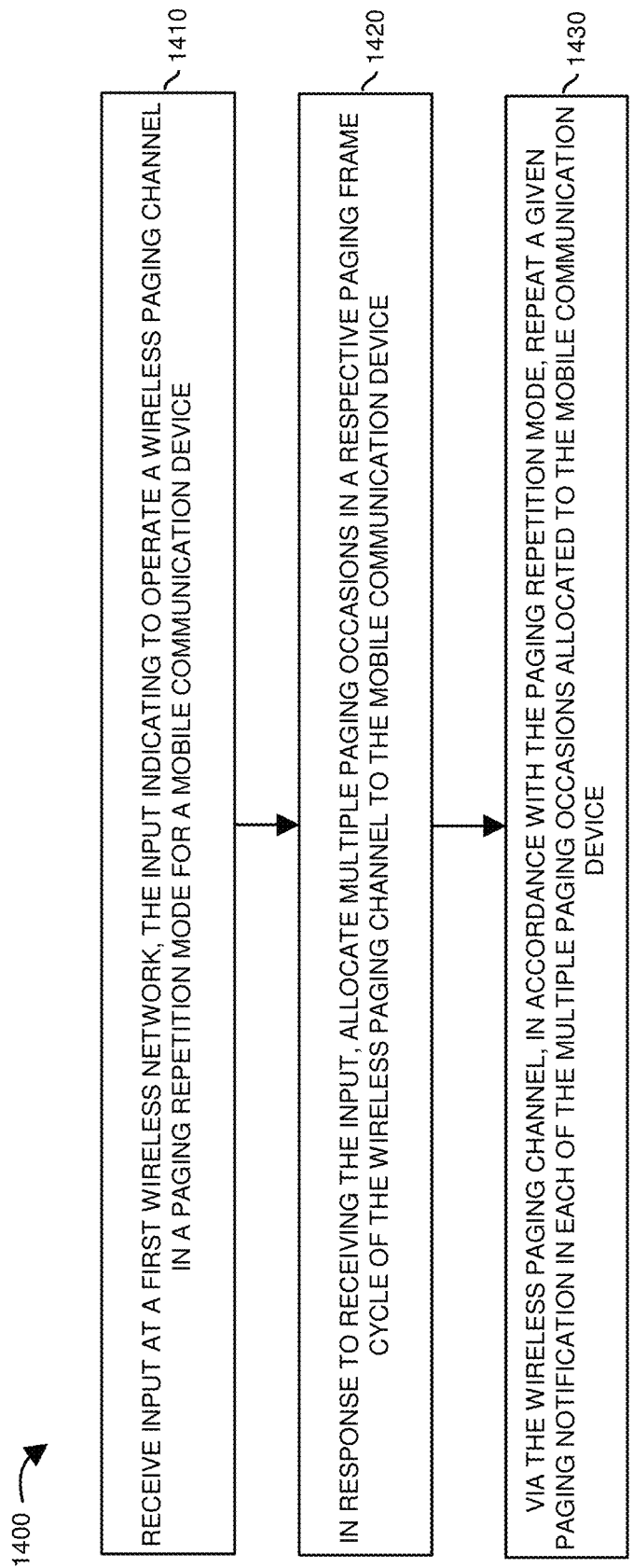
FIG. 14 is an example diagram illustrating a method according to embodiments herein.

FIG. 14 is an example diagram illustrating a method according to embodiments herein. Note that there will be some overlap with respect to concepts as discussed above.

In processing operation 1410 of flowchart 1400, the wireless network 121 receives input indicating to operate a wireless paging channel 131 in a paging repetition mode for the mobile communication device 110.

In processing operation 1420, in response to receiving the input, the wireless network 121 allocates multiple paging occasions in a respective paging frame cycle of the wireless paging channel 131 to the mobile communication device 110.

In processing operation 1430, via the wireless paging channel 131, in accordance with the paging repetition mode for the mobile communication device 110, the wireless network 121 repeats a given paging notification in each of the multiple paging occasions allocated to the mobile communication device 110.

Note again that techniques herein are well suited to facilitate use of a shared wireless channel amongst different types of wireless stations. However, it should be noted that embodiments herein are not limited to use in such applications and that the techniques discussed herein are well suited for other applications as well. Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
via a first wireless network, transmitting first paging notifications to a mobile communication device, the first paging notifications notifying the mobile communication device of paging events associated with the first wireless network;
monitoring a schedule of second paging notifications associated with a second wireless network, the second paging notifications scheduled for transmission to the mobile communication device in paging occasions of a wireless paging channel transmitted from the second wireless network to the mobile communication device; and
via communications from the first wireless network to the mobile communication device, notifying the mobile communication device of the schedule of second paging notifications associated with the second wireless network.

2. The method as in claim 1, wherein notifying the mobile communication device of the schedule of second paging notifications includes:
via the communications, notifying the mobile communication device of an absence of a paging notification in a corresponding paging frame of the wireless paging channel communicated from the second wireless network.

3. The method as in claim 1, wherein notifying the mobile communication device of the schedule of second paging notifications includes:
notifying the mobile communication device of an absence of a paging notification from the second wireless network in a particular paging cycle of multiple paging cycles of the wireless paging channel communicated from the second wireless network.

4. The method as in claim 1, wherein notifying the mobile communication device of the schedule of second paging notifications includes:
notifying the mobile communication device of an upcoming paging notification scheduled for transmission from the second wireless network to the mobile communication device.

5. The method as in claim 1, wherein the communications from the first wireless network to the mobile communication device inform the mobile communication device not to monitor for the second paging notifications from the wireless paging channel communicated from the second wireless network.

6. The method as in claim 1, wherein the communications include a message notifying the mobile communication device to skip monitoring for an upcoming paging notification from the second wireless network, the message included in a paging occasion of a wireless paging channel communicated from the first wireless network.

7. The method as in claim 1, wherein the first paging notifications are associated with a first SIM (Subscriber Identity Module) assigned to the mobile communication device; and
wherein the second paging notifications are associated with a second SIM (Subscriber Identity Module) assigned to the mobile communication device.

8. The method as in claim 7, wherein the first SIM is provided by a first wireless network service provider; and
wherein the second SIM is provided by a second wireless network service provider.

9. The method as in claim 1, wherein the communications include a first paging notification generated by the first wireless network, the first paging notification included in a data field of a downlink control channel message transmitted from the first wireless network to the mobile communication device.

10. The method as in claim 1, wherein a data field of the communications indicates how many occurrences that the second paging notifications are not scheduled for transmission from the second wireless network.

11. The method as in claim 1, wherein the communications control operation of the mobile communication device monitoring for the second paging notifications.

12. The method as in claim 1, wherein the communications include a multiple-bit value indicating the schedule of second paging notifications scheduled to be transmitted by the second wireless network.

13. The method as in claim 12, wherein the multiple-bit value maps to a command for receiving the second paging notifications at the mobile communication device.

14. The method as in claim 1, wherein the communications indicate timing information associated with transmission of the second paging notifications from the second wireless network.

15. The method as in claim 1, wherein the wireless paging channel is a first wireless paging channel;
wherein a second wireless paging channel supports conveyance of the first paging notifications communicated from the first wireless network to the mobile communication device;
wherein the first wireless paging channel supports conveyance of the second paging notifications communicated from the second wireless network to the mobile communication device; and
wherein transmission of the communications to the mobile communication device alleviates the mobile communication device from switching over to monitoring the first paging channel to retrieve the second paging notifications.

16. The method as in claim 15 further comprising:
transmitting the communications in a first wireless paging occasion of the second wireless paging channel to the mobile communication device, the first wireless paging occasion assigned to the mobile communication device.

17. The method as in claim 1 further comprising:
including the communications in a paging occasion of a wireless paging channel transmitted from the first wireless network to the mobile communication device.

18. The method as in claim 1, wherein the communications indicate absence of a paging notification in a paging occasion of the wireless paging channel assigned to the mobile communication device.

19. The method as in claim 18, wherein the paging occasion is a time slot of the wireless paging channel transmitted from the second wireless network to the mobile communication device, the paging occasion assigned to the mobile communication device.

20. The method as in claim 1 further comprising:
transmitting the communications in a paging occasion assigned to the mobile communication device, the paging occasion supporting communication of a paging notification from the first wireless network to the mobile communication device.

21. The method as in claim 1, wherein the paging occasions of the wireless paging channel transmitted from the second wireless network are assigned to the mobile communication device.

22. The method as in claim 21, wherein the second paging notifications are scheduled for transmission from the second wireless network to the mobile communication device in the paging occasions assigned to the mobile communication device.

23. The method as in claim 1, wherein the schedule information indicates timing in which the second wireless network is scheduled to communicate a first paging notification over the wireless paging channel to the mobile communication device; and
wherein the schedule information prompts the mobile communication device to switchover to monitoring the second wireless paging channel to receive the first paging notification as specified by the schedule information.

24. The method as in claim 1, wherein the schedule information indicates absence of paging notifications scheduled for transmission over the wireless paging channel to the mobile communication device.

25. The method as in claim 1, wherein the schedule information prevents the mobile communication device from having to needlessly switch to monitoring the wireless paging channel during a condition in which no paging notifications are scheduled for transmission from the second wireless network over the wireless paging channel to the mobile communication device.

26. The method as in claim 1, wherein the communications from the first wireless network to the mobile communication device indicate the schedule of second paging notifications associated with the second wireless network, preventing the mobile communication device from needlessly tuning away to monitor the paging occasions of the wireless paging channel from the second wireless network to the mobile communication device.

27. A system comprising:
a first wireless network operable to:
transmit first paging notifications to a mobile communication device, the first paging notifications notifying the mobile communication device of paging events associated with the first wireless network;
monitor a schedule of second paging notifications associated with a second wireless network, the second paging notifications scheduled for transmission to the mobile communication device in paging occasions of a wireless paging channel transmitted from the second wireless network to the mobile communication device; and via communications from the first wireless network to the mobile communication device, notify the mobile communication device of the schedule of second paging notifications associated with the second wireless network.

28. The system as in claim 27, wherein the communications notify the mobile communication device of an absence of a paging notification in a corresponding paging frame of the wireless paging channel to the mobile communication device from the second wireless network.

29. The system as in claim 27, wherein the communications notify the mobile communication device of an absence of a paging notification from the second wireless network in a particular paging cycle of multiple paging cycles from the second wireless network to the mobile communication device.

30. The system as in claim 27, wherein the communications notify the mobile communication device of an upcoming paging notification scheduled for transmission from the second wireless network to the mobile communication device.

31. The system as in claim 27, wherein the communications from the first wireless network to the mobile communication device informs the mobile communication device not to monitor for paging notifications from the second wireless base station.

32. The system as in claim 27, wherein the communications include a message notifying the mobile communication device to skip monitoring for a paging notification in the wireless paging channel transmitted from the second wireless network, the communications include in a paging notification from the first wireless network.

33. The system as in claim 27, wherein the first paging notifications are associated with a first SIM (Subscriber Identity Module) assigned to the mobile communication device; and wherein the second paging notifications are associated with a second SIM (Subscriber Identity Module) assigned to the mobile communication device.

34. The system as in claim 33, wherein the first SIM is provided by a first wireless network service provider; and wherein the second SIM is provided by a second wireless network service provider.

35. The system as in claim 27, wherein the communications include a first paging notification generated by the first wireless network, the first paging notification included in a data field of a downlink control channel message from the first wireless network to the mobile communication device.

36. The system as in claim 27, wherein a data field of the communications indicates how many occurrences that the second paging notifications from the second wireless network are not scheduled for transmission from the second wireless network to the mobile communication device.

37. Computer-readable storage hardware having instructions stored thereon, the instructions, when carried out by computer processor hardware, cause the computer processor hardware to:

transmit first paging notifications to a mobile communication device, the first paging notifications notifying the mobile communication device of paging events associated with a first wireless network;

monitor a schedule for second paging notifications associated with a second wireless network, the second paging notifications scheduled for transmission to the mobile communication device in paging occasions of a wireless paging channel transmitted from the second wireless network to the mobile communication device; and via communications from the first wireless network to the mobile communication device, notify the mobile communication device of the schedule of paging notifications associated with the second wireless network.

* * * * *